US011221764B2

(12) United States Patent
Miller et al.

(10) Patent No.: US 11,221,764 B2
(45) Date of Patent: Jan. 11, 2022

(54) PARTITIONED MEMORY WITH SHARED MEMORY RESOURCES AND CONFIGURABLE FUNCTIONS

(71) Applicants: Michael J Miller, Saratoga, CA (US); Michael Morrison, Santa Clara, CA (US); Jay Patel, San Ramon, CA (US); Dipak Sikdar, Santa Clara, CA (US)

(72) Inventors: Michael J Miller, Saratoga, CA (US); Michael Morrison, Santa Clara, CA (US); Jay Patel, San Ramon, CA (US); Dipak Sikdar, Santa Clara, CA (US)

(73) Assignee: MOSYS, INC., San Jose, CA (US)

(*) Notice: Subject to any disclaimer, the term of this patent is extended or adjusted under 35 U.S.C. 154(b) by 187 days.

(21) Appl. No.: 14/503,382

(22) Filed: Sep. 30, 2014

(65) Prior Publication Data

US 2015/0019803 A1    Jan. 15, 2015

Related U.S. Application Data

(63) Continuation-in-part of application No. 13/912,033, filed on Jun. 6, 2013, now Pat. No. 9,667,546, and a
(Continued)

(51) Int. Cl.
*G06F 3/06* (2006.01)
*G06F 12/0875* (2016.01)
(Continued)

(52) U.S. Cl.
CPC .......... *G06F 3/0611* (2013.01); *G06F 3/0644* (2013.01); *G06F 3/0664* (2013.01);
(Continued)

(58) Field of Classification Search
CPC .... G06F 3/0611; G06F 3/0644; G06F 3/0664; G06F 3/0685; G06F 12/0875
See application file for complete search history.

(56) References Cited

U.S. PATENT DOCUMENTS

| 5,172,379 A | * | 12/1992 | Burrer | ................. | G06F 11/1044 |
| | | | | | 711/E12.079 |
| 6,560,686 B1 | * | 5/2003 | Nishida | ................. | G11C 11/408 |
| | | | | | 711/170 |

(Continued)

*Primary Examiner* — Ryan Bertram

(57) ABSTRACT

A memory device that includes an input interface that receives instructions and input data on a first plurality of serial links. The memory device includes a memory block having a plurality of banks, wherein each of the banks has a plurality of memory cells, and wherein the memory block has multiple ports. An output interface provides data on a second plurality of serial links. A cache coupled to the IO interface and to the plurality of banks, stores write data designated for a given memory cell location when the given memory cell location is currently being accessed, thereby avoiding a collision. Memory device includes one or more memory access controllers (MACs) coupled to the memory block and one or more arithmetic logic units (ALUs) coupled to the MACs. The ALUs perform one or more operations on data prior to the data being transmitted out of the IC via the IO, such as read/modify/write or statistics or traffic management functions, thereby reducing congestion on the serial links and offloading appropriate operations from the host to the memory device.

25 Claims, 21 Drawing Sheets

Related U.S. Application Data continuation-in-part of application No. 13/838,971, filed on Mar. 15, 2013, now abandoned, and a continuation-in-part of application No. 13/911,999, filed on Jun. 6, 2013, now abandoned, and a continuation-in-part of application No. 13/841,025, filed on Mar. 15, 2013, now Pat. No. 9,496,009, and a continuation-in-part of application No. 14/031,031, filed on Sep. 18, 2013, now abandoned, and a continuation-in-part of application No. 13/732,783, filed on Jan. 2, 2013, now Pat. No. 9,037,928, and a continuation-in-part of application No. 13/911,218, filed on Jun. 6, 2013, now Pat. No. 9,354,823, which is a continuation-in-part of application No. 13/077,261, filed on Mar. 31, 2011, now Pat. No. 8,473,695, application No. 14/503,382, which is a continuation-in-part of application No. 12/697,141, filed on Jan. 29, 2010, now Pat. No. 9,342,471.

(60) Provisional application No. 61/656,377, filed on Jun. 6, 2012, provisional application No. 61/656,423, filed on Jun. 6, 2012, provisional application No. 61/702,253, filed on Sep. 18, 2012, provisional application No. 61/582,365, filed on Jan. 1, 2012, provisional application No. 61/656,453, filed on Jun. 6, 2012.

(51) Int. Cl.
*G06F 9/30* (2018.01)
*G06F 9/38* (2018.01)

(52) U.S. Cl.
CPC ........ *G06F 3/0685* (2013.01); *G06F 9/30047* (2013.01); *G06F 9/3877* (2013.01); *G06F 12/0875* (2013.01); *G06F 2003/0698* (2013.01); *G06F 2212/452* (2013.01)

(56) References Cited

U.S. PATENT DOCUMENTS

| | | | | |
|---|---|---|---|---|
| 2005/0240745 | A1* | 10/2005 | Iyer | G06F 12/0223 711/167 |
| 2007/0073980 | A1* | 3/2007 | Chung | G06F 13/28 711/149 |
| 2011/0197087 | A1* | 8/2011 | Sikdar | G06F 1/08 713/501 |
| 2011/0255359 | A1* | 10/2011 | Sachdev | G11C 7/062 365/207 |
| 2011/0310691 | A1* | 12/2011 | Zhou | G11C 8/16 365/230.03 |
| 2012/0047260 | A1* | 2/2012 | Patel | H04L 49/9057 709/225 |

* cited by examiner

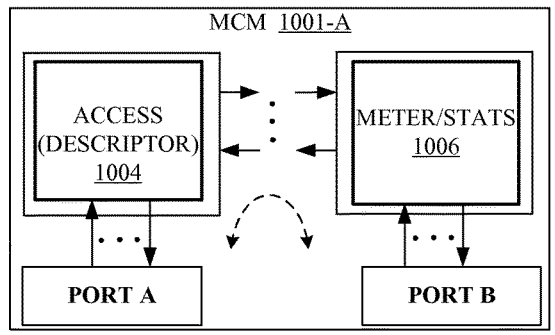
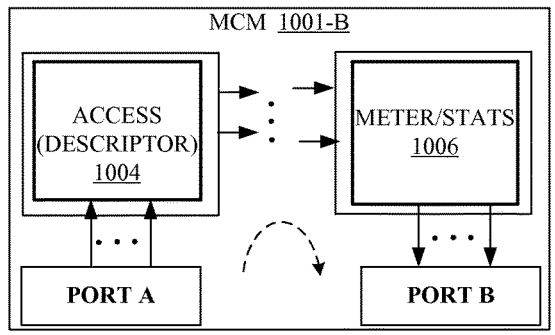
FIG. 10A  FIG. 10B
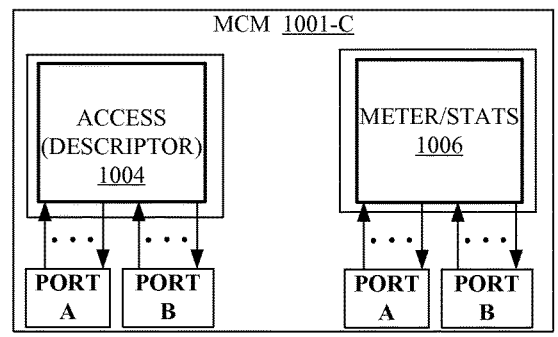
FIG. 10C
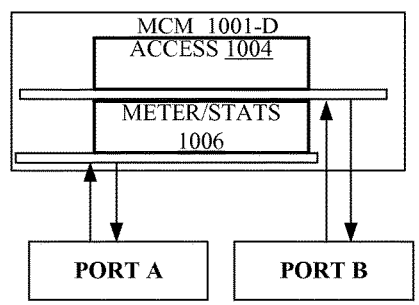
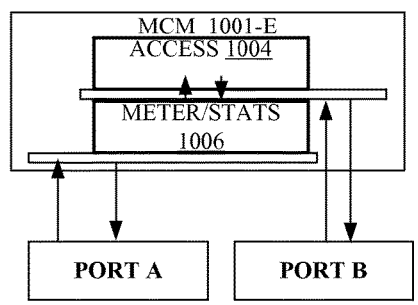
FIG. 10D  FIG. 10E

PARTITIONED MEMORY WITH SHARED MEMORY RESOURCES AND CONFIGURABLE FUNCTIONS

CROSS-REFERENCE TO RELATED APPLICATIONS

This application is a continuation-in-part with priority claimed for all commonly disclosed subject matter, which further claims priority to the following co-pending U.S. non-provisional and provisional patent applications:

U.S. patent application Ser. No. 13/912,033, filed on Jun. 6, 2013, entitled "PROGRAMMABLE PARTITIONABLE COUNTER," by Michael Morrison, et al., (the "First related application");

U.S. patent application Ser. No. 13/838,971, filed on Mar. 15, 2013, entitled "TRAFFIC METERING AND SHAPING FOR NETWORK PACKETS," by Man Kit Tang et al., (the "Second related application"); and U.S. patent application Ser. No. 13/911,999, filed on Jun. 6, 2013, entitled "DUAL COUNTER," by Jay Patel, et al., (the "Third related application");

which said First, Second, and Third related applications claiming priority to U.S. provisional Patent Application No. 61/656,377, filed on Jun. 6, 2012, entitled "MEMORY DEVICE WITH AN EMBEDDED LOGIC UNIT" by Man Kit Tang et al.; and with priority claimed for all commonly disclosed subject matter, which further claims priority to U.S. patent application Ser. No. 13/841,025, filed on Mar. 15, 2013, entitled "MEMORY WITH BANK-CONFLICT-RESOLUTION (BCR) MODULE INCLUDING CACHE," by Dipak Sikdar et al., (the "Fourth related application") which said Fourth related application claims priority to U.S. provisional Patent Application No. 61/656,423, filed on Jun. 6, 2012, entitled "MEMORY WITH BANK-CONFLICT-RESOLUTION (BCR) MODULE INCLUDING CACHE." by Dipak Sikdar et al.; and with priority claimed for all commonly disclosed subject matter, which further claims priority to U.S. patent application Ser. No. 14/031,031, filed on Sep. 18, 2013, entitled "SUBSTITUTE REDUNDANT MEMORY," by Dipak Sikdar et al., (the "Fifth related application") which said Fifth related application claims priority to U.S. provisional Patent Application No. 61/702,253, filed on Sep. 18, 2012, entitled "SHARED MEMORY REDUNDANCY," by Dipak Sikdar"); and with priority claimed for all commonly disclosed subject matter, which further claims priority to U.S. patent application Ser. No. 13/732,783, filed on Jan. 2, 2013, entitled "MEMORY DEVICE WITH BACKGROUND BUILT-IN SELF-TESTING AND BACKGROUND BUILT-IN SELF-REPAIR," by Bendik Kleveland, et al., (the "Sixth related application") which said Sixth related application claims priority to U.S. provisional Patent Application No. 61/582,365, filed on Jan. 1, 2012, entitled "HIDDEN MEMORY REPAIR." by Bendik Kleveland et al.; and with priority claimed for all commonly disclosed subject matter, which further claims priority to U.S. patent application Ser. No. 13/911,218, filed on Jun. 6, 2013, entitled "MEMORY SYSTEM INCLUDING VARIABLE WRITE BURST AND BROADCAST COMMAND SCHEDULING," by Michael J. Miller et al., (the "Seventh related application"), which said Seventh related application claims priority to U.S. patent application Ser. No. 13/077,261, now issued U.S. Pat. No. 8,473,695, filed on Mar. 31, 2011 and issued on Jun. 25, 2013, entitled "MEMORY SYSTEM INCLUDING VARIABLE WRITE COMMAND SCHEDULING." by Jay Patel et al, (the "Eighth related application"), and which said Seventh related application claims priority to U.S. provisional Patent Application No. 61/656,453, filed on Jun. 6, 2012, entitled "MEMORY SYSTEM INCLUDING VARIABLE WRITE COMMAND SCHEDULING" by Michael J. Morrison; and with priority claimed for all commonly disclosed subject matter, which further claims priority to U.S. patent application Ser. No. 12/697,141, filed on Jan. 29, 2010, entitled "High Utilization Multi-Partitioned Serial Memory, by Michael Miller et al., (the "Eighth related application"); all of which listed application(s) are commonly assigned herewith, the contents of which are incorporated by reference herein in their entirety.

FIELD OF TECHNOLOGY

The present invention relates to a memory device that includes a serial interface and multiple memory partitions, and operates in a synchronous manner.

SUMMARY

Accordingly, the present invention provides a multi-partition memory device that includes a serial interface and operates in a synchronous manner, with a known fixed access latency. Instructions and input data are provided to the memory device at a high frequency (e.g., 10 G) on a plurality of serial links. Received instructions and input data are de-serialized on the memory device, and are provided to a memory controller. The memory controller initiates accesses to a memory core in response to the received instructions. The memory core includes a plurality of memory partitions, which are accessed in a cyclic overlapping manner within a single system clock cycle. Stated another way, the memory partitions are sequentially accessed during assigned time slots, which are referenced to a system clock signal. Accessing the memory partitions in this manner allows each of the memory partitions to operate at a slower frequency than the serial links, while allowing the memory partitions to service the received instructions properly. Accesses to the multi-partition memory device are performed in a synchronous manner in response to a system clock signal. The access latency of the multi-partition memory system can be specified by a number of cycles of the system clock signal. Advantageously, accesses to the multi-partition memory system of the present invention do not require arbitration.

The memory device can be configured to provide at least the following five functions.

First, a burst data function via the IO interface that emulates a dynamic random access memory (DRAM), wherein a single read or write command to a starting memory address is followed by a plurality of frames of data to be read or written, respectively, to memory addresses related to, and following from, the starting memory address.

Second, a random access memory (RAM) function via the IO interface, wherein a read and a write command can simultaneously access a same memory location in any of a plurality of memory banks, with memory cells having a single-port construction Third, a broadcast write function can write a given data to a plurality of partitions of the memory block, wherein at least one of the partitions is not available to be read from at the same time as at least one other partition of the memory block. This provides a plurality of times at which the given data may be accessed from a plurality of portions of the memory block, thereby reducing latency for a read operation.

Fourth, a traffic metering function for measuring and recording a rate of bytes of traffic for each of a plurality of users based on a bytes input from an external source and based on an elapsed time measured from a (internal) clock signal, wherein the metering function receives a quantity of bytes of traffic for each of the plurality of users.

Fifth, a statistics counter function for recording a count of bytes or packets of for each of a plurality of users based on a bytes input from an external source.

A network system that couples a master integrated circuit device to a slave memory integrated circuit device can provide a statistics function, and optionally a returned statistics result, from the slave memory device to the master device based on a single command from the master device to the slave memory device. Similarly, the system can perform a traffic metering function on network packets, and optionally receive traffic metering result back, via a single command from the access, or master, device to the memory, or slave, device.

The methods, operations, processes, systems, and apparatuses disclosed herein may be implemented in any means for achieving various aspects, and may be executed in a form of a machine-readable medium, and/or a machine accessible medium, embodying a set of instructions that, when executed by a machine or a data processing system (e.g., a computer system), in one or more different sequences, cause the machine to perform any of the operations disclosed herein. Other features will be apparent from the accompanying drawings and from the detailed description that follows. Accordingly, the specification and drawings are to be regarded in an illustrative rather than a restrictive sense.

BRIEF DESCRIPTION OF THE VIEW OF DRAWINGS

Example embodiments are illustrated by way of example and not limitation in the figures of the accompanying drawings, in which like references indicate similar elements and in which:

FIGS. 1A, 1B, and 1C are block diagrams of a system that includes an accessing device and a multi-partition memory system in accordance with one embodiment of the present invention.

FIGS. 10A-10E are block diagrams of a planar and stacked die multi-chip module (MCM) including a combination of differently configured memory devices in accordance with one embodiment of the present invention.

Other features of the present embodiments will be apparent from the accompanying drawings and from the detailed description that follows.

DETAILED DESCRIPTION

Figure 1A:
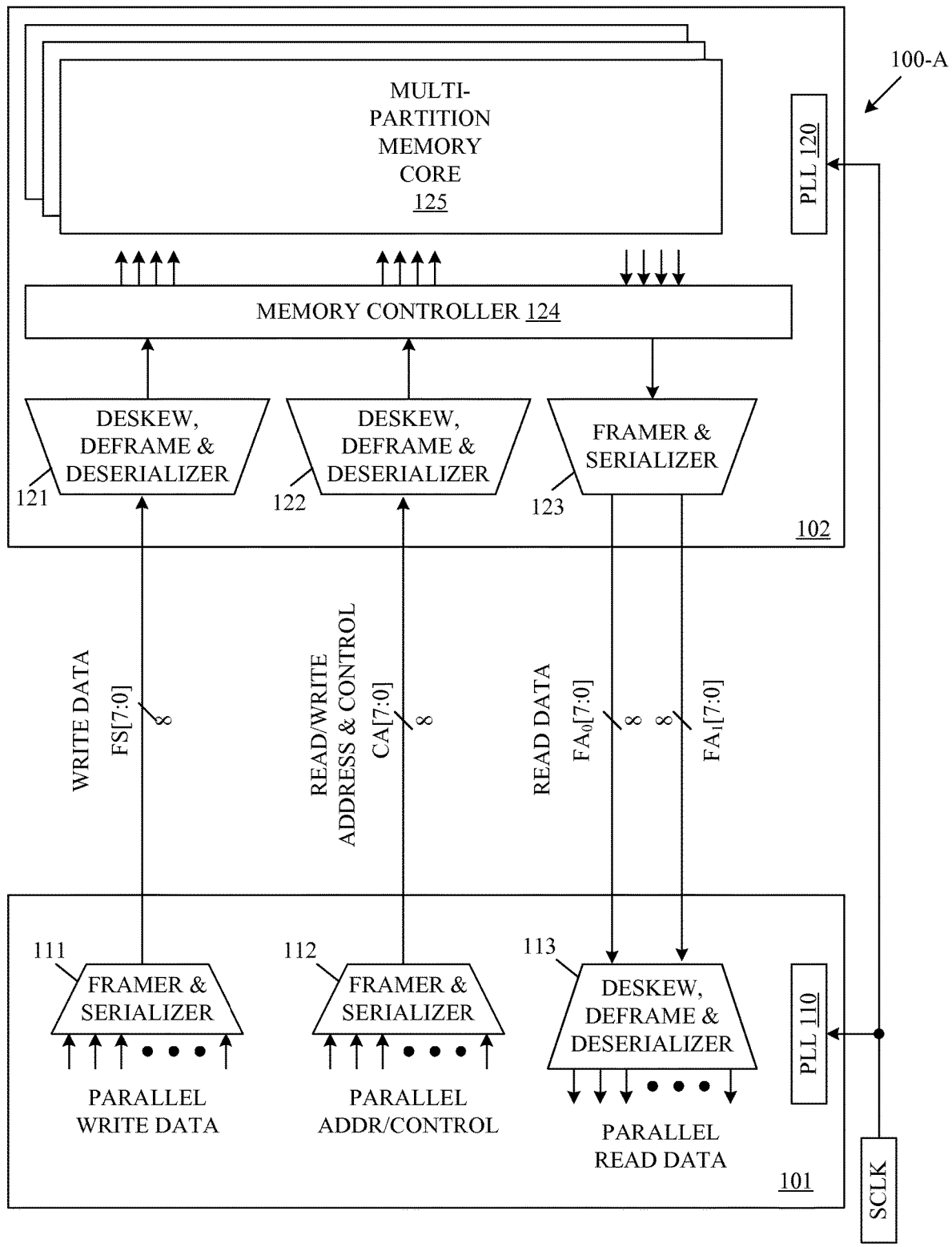

FIG. 1A is a block diagram of a system 100-A in accordance with one embodiment of the present invention. System 100-A includes an accessing device 101 and a memory device 102. Accessing device 101 may be, for example, a system-on-a-chip (SOC) that includes a processor (not shown) that initiates accesses to memory device 102. In some embodiments, accessing device 101 is a packet processor. Accessing device 101 may be any type of processor including, but not limited to: a central processing unit, a microprocessor, a graphics processing unit, a physics processing unit, a digital signal processor, a network processor, a front end processor, a coprocessor, a data processor, an audio processor, a multi core processor, an ASIC, a systemon-chip (SoC), a structured ASIC, an FPGA, etc. Accessing device 101 is capable of performing commands on external memory. As an example, accessing device 101 may fetch data from a memory block, perform a command using the data received from the memory block, write back to the memory block, and then send a command that updates the memory block's internal counters. In various embodiments, memory core 125 may be serial or parallel accessed. In some embodiments, memory core 125 may comprise memory construction including, but not limited to: SRAM, DRAM, embedded DRAM, 1T-SRAM, Quad Data Rate SRAM, RLDRAM, or Flash as examples.

Accessing device 101 is coupled to memory device 102 by a plurality of serial links. In the described examples, eight serial links FS[7:0] are used to transmit frame store (write) data from accessing device 101 to memory device 102, and eight serial links CA[7:0] are used to transmit command/address signals from accessing device 101 to memory device 102. Sixteen serial links $FA_0[7:0]$ and $FA_1[7:0]$ are used to transmit frame access (read) data from memory device 102 to accessing device 101. In the described embodiments, each of the serial links implements differential signaling, and transmits information at a rate of 10 Gigabits/second (10 G).

Although the present invention is described in connection with a particular number of serial links, which operate at a particular transfer rate, it is understood that other numbers of serial links, and other transfer rates, may be used in other embodiments. Moreover, although the examples described herein use a first set of serial links FS[7:0] to transmit write data and a second set of serial links CA[7:0] to transmit command/address signals, it is understood that a common set of serial links could be used to transmit write data and command/address signals in a time multiplexed manner. For example, the control/address signals associated with a transaction could be sent over sixteen serial links (FS[7:0] and CA[7:0]) during a first time period, and the corresponding write data (if any) could be sent over these same sixteen serial links during a second time period.

Within accessing device 101, framer and serializer block 111 converts parallel write data into serial write data, which is transmitted to memory device 102 on serial links FS[7:0]. Similarly, framer and serializer block 112, converts parallel address/control information into serial data, which is transmitted to memory device 102 on serial links CA[7:0]. Within memory device 102, deskew, deframe and deserializer blocks 121 and 122 receive the serial data on serial links FS[7:0] and CA[7:0], and convert this data to parallel information, which is provided to memory controller 124. In response, memory controller 124 performs accesses to multi-partition memory core 125 as specified by the address/control information received on serial links CA[7:0]. Read accesses result in parallel data being provided from multi-partition memory core 125 to memory controller 124, and then to framer and serializer block 123. Framer and serializer block 123 converts the parallel read data into serial data, which is transmitted to accessing device 101 on serial links $FA_0[7:0]$ and/or $FA_1[7:0]$. Deskew, deframe and deserializer block 113 converts the data provided on serial links $FA_0[7:0]$ and $FA_1[7:0]$ into parallel read data, which is used by accessing device 101.

As described in more detail below, overlapping accesses may be performed in a cyclic random manner within multi-partition memory core 125, such that a relatively high data transfer rate to/from multi-partition memory core 125 is achieved. In the described embodiments, the high data transfer rate provided by the serial links FS, CA and $FA_X$ prevents the interface between devices 101 and 102 from being a limiting factor in transfers between these devices.

Accessing device 101 and memory device 102 include phase lock loops (PLLs) 110 and 120, respectively. PLLs 110 and 120 generate internal clock signals in response to a common system clock SCLK. The internal clock signals generated by PLLs 110 and 120 are used to control the timing of transactions within devices 101 and 102, respectively. The transactions between accessing device 101 and memory device 102 are synchronous with respect to the system clock signal SCLK. That is, when accessing device 101 initiates an access to memory device 102, that access will be completed by memory device 102 with a fixed latency with respect to the system clock signal SCLK. For example, if accessing device 101 initiates a read access, then memory device 102 will perform a corresponding read operation and return a read data value to accessing device with a known latency, which is referenced to the system clock signal SCLK. Similarly, if accessing device 101 initiates a write access, the memory device 102 completes the corresponding write operation with a known latency, which is referenced to the system clock signal SCLK. Advantageously, memory device 102 does not need to perform arbitration of access requests, or engage in handshaking operations with accessing device 101.

In accordance with one aspect of the present invention, the serial links CA[7:0] between accessing device 101 and memory device 102 are used to specify input/output (I/O) transactions in addition to read and write accesses (i.e., compound memory macro operations). As a result, I/O transactions between accessing device 101 and memory device 102 are advantageously made more efficient. For example, accessing device 101 may specify packet operations (pack/unpack, queue/unqueue), statistics operations (increment, decrement), and/or link list operations (insert/delete, follow), which are performed entirely within memory device 102. An exemplary I/O transaction that specifies a statistics operation (i.e., a counter increment function) is described in more detail below. While FIG. 1A describes the interface as a serial interface, the present disclosure is well suited to having interface between access device 101 and memory device 102 as a parallel interface, e.g., with segregated write, read, and address and control lines as shown in subsequent FIG. 1C.

No processors are included in the integrated circuit memory device 102. This is because features and functions that are implemented on memory device 102, such as those described herein, e.g., RMW and statistics, are performed based on the operation code (opcode) provided by the accessing device 101. Thus, processor hardware and function, such as fetch instructions, instruction memory cache, firmware, prognosticating control of instructions, etc., are neither needed, nor implemented on memory device 102.

Figure 1B:
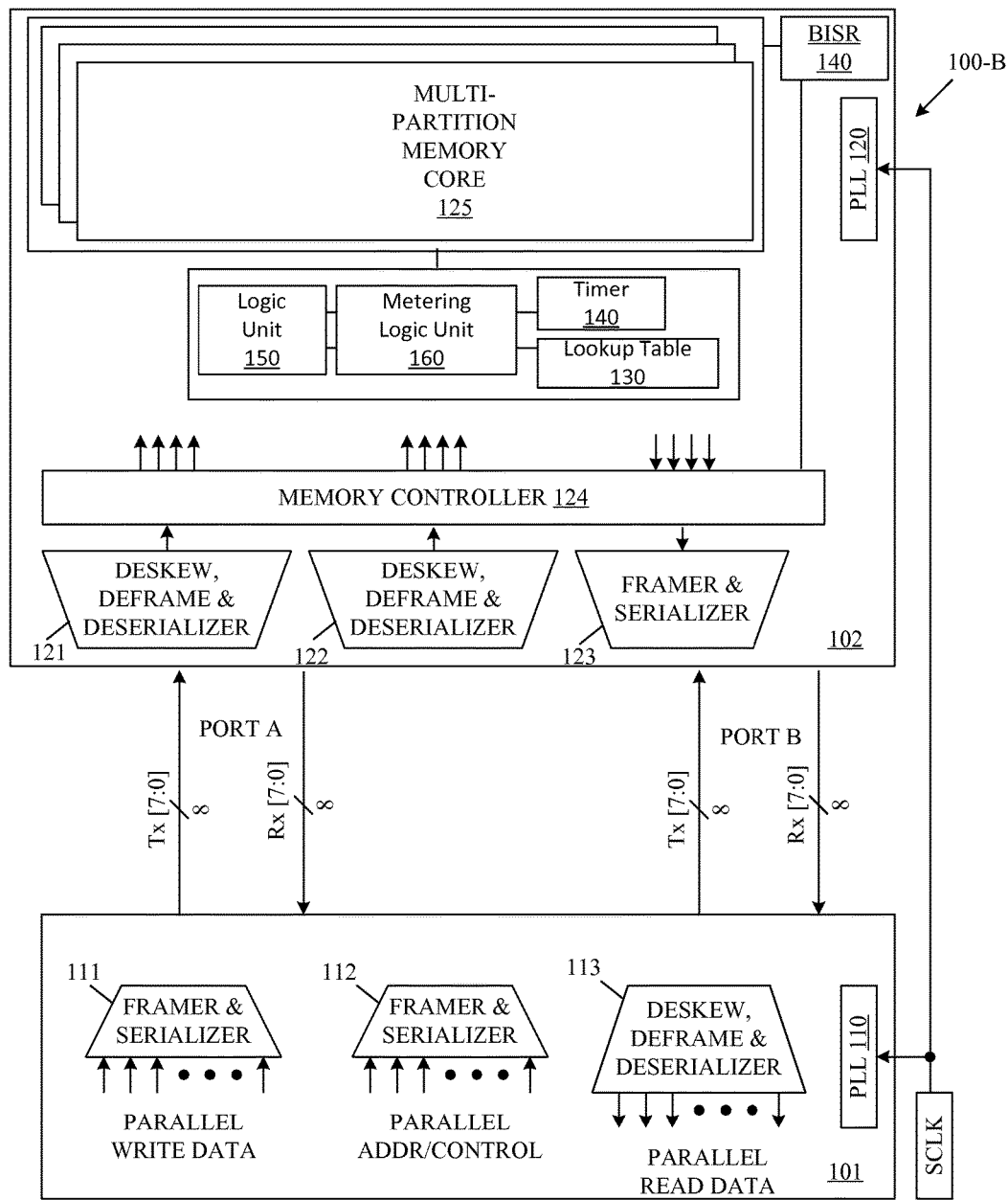

FIG. 1B is an alternative embodiment of the block diagram of system 100-B in accordance with one embodiment of the present invention. Link between accessing device 101 and memory device 102, is provided by two ports, Port A and Port B, each having a plurality of transmit lanes Tx[7:0] and a plurality of receive lanes Rx[7:0]. Further, memory device 102 comprises logic unit 150 coupled to memory core 125.

While shown as two separate and distinct ports, Ports A and B both have full access to any memory on memory device 102. Command, address, and data are transmitted over these lanes in frames, rather than on dedicated function lines, e.g., command only lines, which can further be divided into multiple, e.g., two slots. A wide variety of combinations and permutations of different commands and data can be used in each slot, e.g., a read command in the left slot and a write command in the right slot of a given frame followed by subsequent frames having data in one or both slots for the write. For data, the split in the frame can correspond to a high and low split of memory word for writing into memory, e.g., two 36-bit slots to make one 72 bit word, or the writing of only a high 36-bit portion of a word into memory. A read access from memory retrieves the whole 72-bit word. By allowing half-frame granularity and the mixing of commands and data, high efficiency of bandwidth is achieved with low overhead, e.g., with an approximate 200% improvement in access rate over alternative methods. Ports A and B can be controlled by a single access device, e.g., 101, or can be split to two separate access devices, both of which can access any available portion of memory device 102. This architecture is implemented in subsequent FIG. 2A as having data, address, or command information transmitted on lanes, e.g., FS[7:0] and CA[7:0]. More detail on instruction set architecture is presented in commonly owned U.S. patent application Ser. No. 13/911,218 to Mike Morrison et al., entitled "MEMORY SYSTEM INCLUDING VARIABLE WRITE BURST AND BROADCAST COMMAND SCHEDULING", previously incorporated by reference herein.

Furthermore, memory device 102 contains an internal arithmetic logic unit (ALU or logic unit) 150 such that when accessing device 101 attempts to perform an operation using data located in memory core 125, rather than sending the data directly from memory core 125 to accessing device 101 to perform a command, the logic unit 150 can perform a command, update the internal counter of memory core 125, send data to memory core 125, and/or send data to accessing device 101. In some embodiments, memory core 125 may be partitioned memory. Logic unit 150 can access, modify and retire networking operations wholly within memory device 102. Logic unit 150 supports statistics, counters and other applications, and reduces the latency and bandwidth requirements for macro operations.

Latency is reduced with memory device 102 since an accessing device 101 does not need to send and receive as much data because of embedded logic unit 150 of memory device 102. Additionally, more bandwidth is available because memory device 102 does more work locally. In some embodiments, a plurality of commands may be performed within memory device 102 after memory device 102 receives a single command from accessing device 101. As a result, the amount of packet processing operations by accessing device 101 is reduced. In particular, accessing device 101 is not required to perform identical processing commands because it offloads some processing to memory device 102.

Memory device 102 includes timer 140 that sends a signal into logic unit 150 and metering logic unit 160. Memory device 102 can include a plurality of timers 140. Timers 140 can determine the amount of time that has passed since a particular event. For example, timers 140 may determine the amount of time that has passed since a record or information about a user/account was accessed.

Memory device 102 includes lookup table 130. In one embodiment, as traffic passes through logic unit 150 lookup table 130 provides logic unit 150 and/or metering logic unit 160 with actions that should be performed on the traffic. In one embodiment, when either logic unit 150 or metering logic unit 160 receives a packet, lookup table 130 may look up whether a bucket contains sufficient tokens and whether that traffic may be passed. Memory device 102 then returns a metering result (e.g., whether that traffic may be passed) to the host ASIC/accessing device 101. In some embodiments, the lookup table 130 may be configured to carry out a plurality of procedures.

Metering logic unit 160, in some embodiments, runs in parallel with logic unit 150 and, as discussed below, meters and marks traffic to ensure compliance with a traffic contract. Note that in some embodiments, memory device 102 does not comprise a metering logic unit 160. In some embodiments, the logic unit 150 performs operations related to metering traffic, marking traffic, and sending signals to accessing device 101 or traffic conditioner 170.

Accessing device 101 includes traffic conditioner (not shown) that, as discussed below, shapes and drops packets in response to signals/recommendations received by metering logic unit 160 or logic unit 150. In some embodiments, accessing device 101 may disregard incoming data from memory device 102 that recommends whether accessing device 101 should send, delay or drop a packet.

Metering, Policing, and Shaping

Embodiments of the present invention provide for metering data packets. Metering is the process of governing network traffic for compliance with a traffic contract and taking steps to enforce that contract.

A traffic contract is similar to a service level agreement with a broadband network. In various embodiments, networks employ an asynchronous transfer mode (ATM). When a service or application wishes to use a broadband network to transport traffic, it must first inform the network about what kind of traffic is to be transported, and in some cases the performance requirements of the traffic. In some networks, regardless of the traffic contract, if bandwidth is available packets may be sent. In some networks, the time of day or the network congestion may be used to determine whether packets may be sent. In other words, the decision to send a packet may be based on the time of day or the congestion on a given network. A network may require an application wishing to send traffic over the network to indicate the type of service required, traffic parameters of the data flow in each direction, and/or the quality of service parameters requested in each direction. Services include, but are not limited to: the constant bit rate, the real-time variable bit rate, the non-real-time variable bit rate, the applicable bit rate and the unspecified bit rate.

When metering traffic, traffic that is in violation of a traffic contract may be dropped, marked as non-compliant, or left as-is depending on the policies of a network. Policing refers to dropping or disregarding traffic. "Coloring" refers to marking traffic as compliant, semi-compliant, or in violation/non-compliant. In addition, shaping refers to rate limiting, or delaying traffic to bring packets into compliance with a traffic policy.

In some embodiments, metering is performed using at least one token bucket. When metering logic unit 160 is determining whether a packet complies with a traffic contract, it will determine whether a bucket contains sufficient tokens to send the packet. Bucket tokens may be credited or debited. If a bucket contains a sufficient number of tokens such that a packet is in compliance, the appropriate number of tokens (which may be equivalent to the length of a packet in bytes) are removed, or debited/charged, from the token bucket and the packet is sent. In one embodiment, the packet is colored based on whether sufficient tokens are available. In another embodiment, if there are insufficient tokens in a bucket or buckets (e.g., main bucket, sister bucket, etc.) the packet is not in compliance and the contents of the bucket are not charged. Non-compliant packets may be dropped, queued for subsequent transmission when sufficient tokens have accumulated in a bucket, or transmitted after it is marked as in violation/non-compliant. If a packet is marked as in violation, it may be dropped if the network is subsequently overloaded. It should be understood that a leaky bucket may be employed in some embodiments. In general, a leaky bucket is used to check that data transmissions, in the form of packets, conform to defined limits on bandwidth and burstiness (a measure of the unevenness or variations in the traffic flow).

Figure 1C:
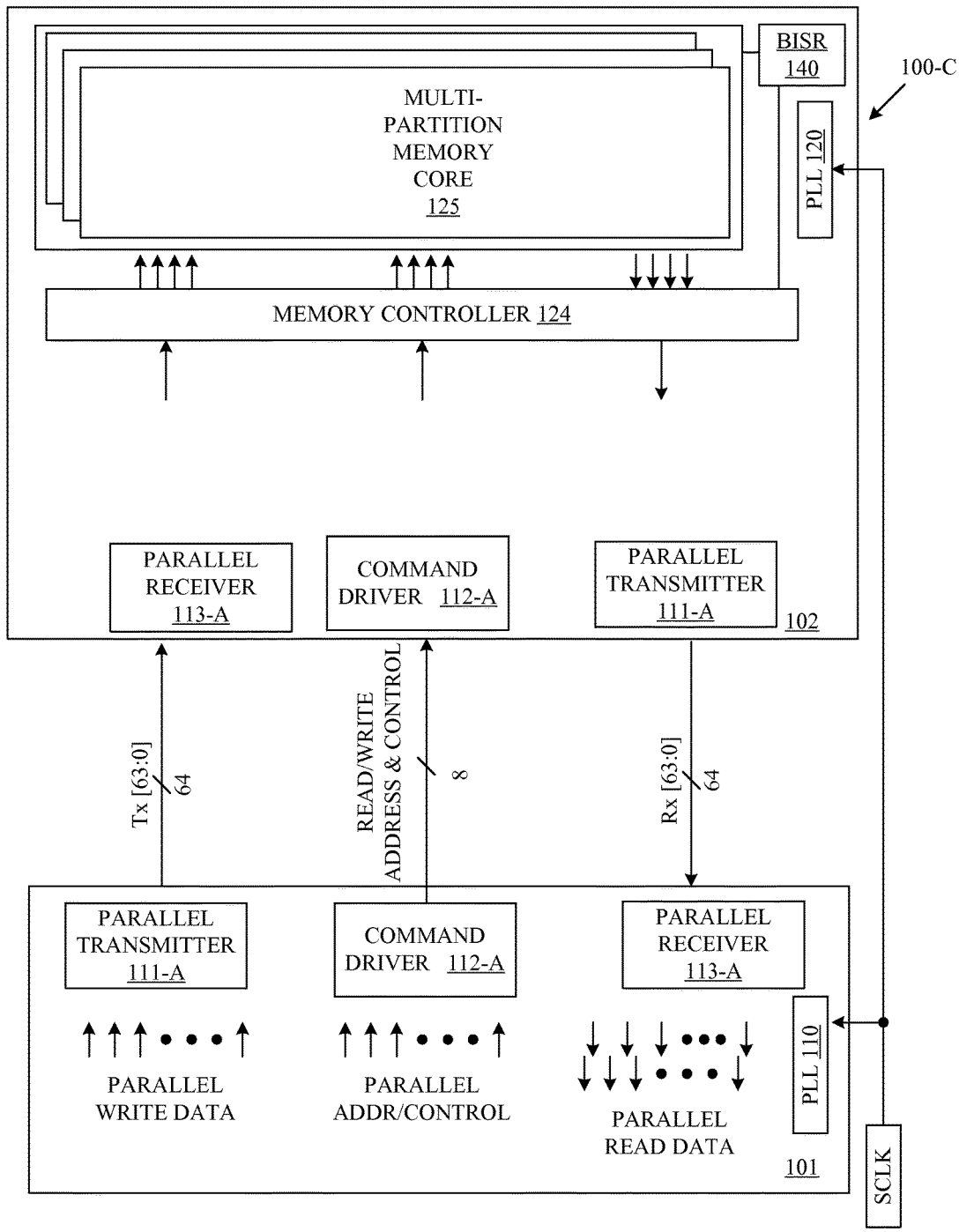

FIG. 1C is an alternative embodiment of the block diagram of system 100-C in accordance with one embodiment of the present invention. Link between accessing device 101 and memory device 102 is provided by parallel lines having any number of lanes, e.g., Tx[63:0] and a plurality of receive lanes Rx[63:0] and a separate read/write address and control line Tx[8:0]. All the functionality in the present disclosure is equally applicable to either SerDes interface or a parallel interface.

Figure 2A:
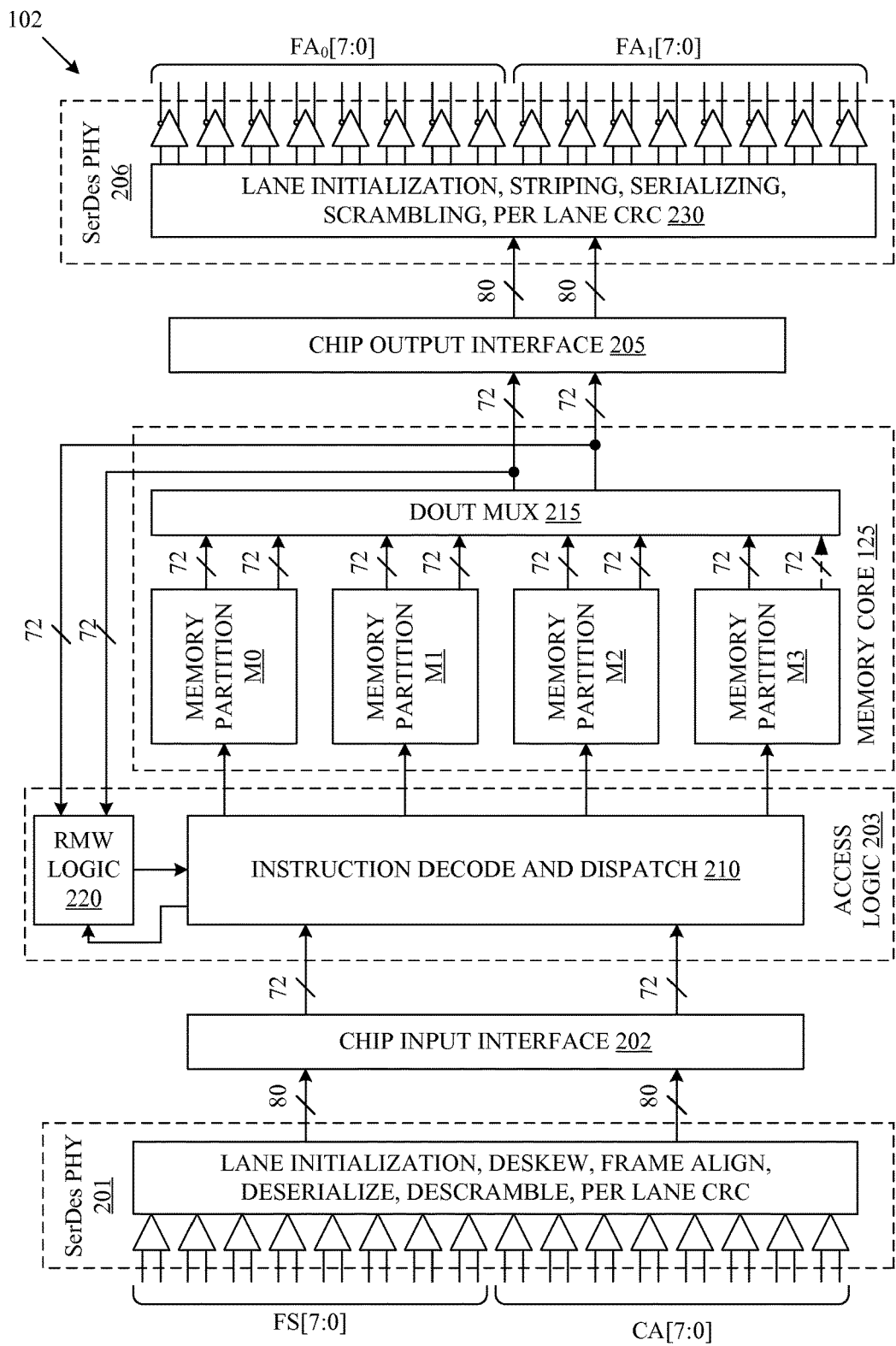
FIG. 2A is a block diagram that illustrates the multi-partition memory system of FIGS. 1A-B in more detail in accordance with one embodiment of the present invention.

FIG. 2A is a block diagram that illustrates memory system 102 in more detail in accordance with one embodiment of the present invention. Memory system 102 includes serial/deserial (SerDes) physical layer interfaces (PHYs) 201 and 206, chip input interface 202, access logic block 203, multi-partition memory core 125 and chip output interface 205. In general, SerDes PHY 201 corresponds with the deskew, deframe and deserializer blocks 121-122 of FIGS. 1A-B, and SerDes PHY 206 corresponds with the framer and serializer block 123 of FIGS. 1A-B. Chip input interface 202, access logic 203 and chip output interface 205 roughly correspond with memory controller 124 of FIGS. 1A-B.

In general, SerDes PHY 201 is coupled to serial links FS[7:0] and CA[7:0], and receives the corresponding write data and address/control information transmitted on these serial links. SerDes PHY 201 performs lane initialization, deskewing, frame alignment, deserialization, descrambling and per lane error correction (CRC) on the received serial data. In the described example, SerDes PHY 201 performs these operations in response to a local bit clock signal, which is generated by PLL 120 in response to the system clock signal SCLK. Upon completing the above-described operations, SerDes PHY 201 provides 80-bit wide values (frames) to chip input interface 202. In the described examples, SerDes PHY 201 provides one 80-bit frame (e.g., write data) from serial links FS[7:0] and one 80-bit frame (e.g., access instructions) from serial links CA[7:0] every ten cycles of a bit-clock (i.e., at a frequency of 1 GHz, assuming a SerDes rate of 10 Gbps).

Chip input interface 202 performs error checking and correction on the received 80-bit frame values, and in response, provides 72-bit corrected frame values (i.e., 72-bit access instructions and 72-bit write data values) to access logic 203. Chip input interface 202 also performs administrative activities, which may include, for example, maintaining a frame count and requesting the retransmission of frames, if necessary. Chip input interface 202 operates in response to the local bit clock signal, and routes the 72-bit corrected frame values at a frequency of 1 GHz, for example.

Within access logic block 203, instruction decode and dispatch logic 210 receives the 72-bit corrected frame values provided by chip input interface 202. Instruction decode and dispatch logic 210 decodes the 72-bit corrected frame value that was received from command/address serial links CA[7:0], thereby identifying the access operation(s) specified by this 72-bit corrected frame value (i.e., access instruction). These operations may include, but are not limited to: read, write, read-modify-write, and no operation. The 72-bit corrected frame value received from command/address serial links CA[7:0] also identifies the address of the memory partition to be accessed within multi-partition memory core 125. In the described embodiment, multi-partition memory core 125 includes four memory partitions M0-M3. However, it is understood that other numbers of memory partitions can be used in other embodiments. Upon decoding an access instruction in the above-described manner, instruction decode and dispatch logic 210 initiates an access (or accesses) to the memory partition specified by the access instruction.

In accordance with one embodiment, each of the memory partitions in memory core 125 has an operating frequency that is 1/N the frequency at which data is provided to instruction decode and dispatch logic 210, wherein N represents the number of partitions in memory core 125. As described above, the 72-bit corrected frame values are provided to instruction decode and dispatch logic 210 at a frequency of 1 GHz in the described embodiment. In this embodiment, each of the memory partitions M0-M3 operates at a frequency of 250 MHz (i.e., 1 GHz/4). Accesses to memory partitions M0-M3 are initiated during pre-assigned time slots, such that each of the memory partitions M0-M3 receives, at most, one access instruction every four cycles of a 1 GHz clock signal.

In the examples described herein, each of memory partitions M0-M3 is implemented by 64 memory banks, each having the capacity to store 32K entries of 72-bits each. Each of the memory partitions M0-M3 includes two 72-bit read data buses. The memory banks in each memory partition are coupled to both of the two 72-bit read data buses associated with the memory partition. As described in more detail below, two different memory banks within a given memory partition may be read simultaneously, with the resulting read data values being provided on the two 72-bit read data buses of the memory partition. As also described in more detail below, a write data value can be written to a first memory bank within a given memory partition, while a read data value can be simultaneously read from a second bank within the same memory partition. In addition, one embodiment couples two 72-bit write data buses to each of the memory banks in each memory partition. As described in more detail below, two different memory banks within a given memory partition may be written to simultaneously, with the resulting written data values being provided on the two 72-bit read data buses of the memory partition.

In the described examples, each of the memory banks has an operating frequency of 250 MHz. One exemplary method and structure for implementing the memory partitions M0-M3 is described in more detail in commonly owned, co-filed U.S. patent application Ser. No. 12/697,150, to Richard S. Roy and Dipak Sikdar, titled "HIERARCHICAL MULTI-BANK MULTI-PORT MEMORY ORGANIZATION", which is hereby incorporated by reference in its entirety. In an alternate embodiment, each of the memory partitions M0-M3 may be implemented by one (or more) memory arrays (including but not limited to a dual-port, tri-port, single-port arrays or a combination thereof). For example, each memory partition M0-M3 can be implemented by a conventional multi-port SRAM array, which is capable of performing two simultaneous read operations, or simultaneous read and write operations, as required by the described embodiments.

Memory partitions M0-M3 operate in response to a memory cycle clock having a relatively low frequency (e.g., 250 MHz). The memory cycle clock can be created, for example, by a PLL (not shown), which receives the local bit clock, and in response, generates the memory cycle clock.

Although memory partitions M0-M3 are described as having two read data buses in the described examples, it is understood that each memory partition may have a single read output data bus in other embodiments. Moreover, although memory partitions M0-M3 are described as having a plurality of memory banks in the described examples, it is understood that each memory partition may be implemented as a single memory bank in other embodiments.

Data output multiplexer 215 receives the 72-bit data values read from memory partitions M0-M3. Instruction decode and dispatch logic 210 controls data output multiplexer 215 to route the 72-bit data values read from memory partitions M0-M3. In the described example, data output multiplexer 215 routes the 72-bit data values (or pairs of 72-bit data values) read from memory partitions M0-M3 at a frequency of 1 GHz. More specifically, data output multiplexer 215 routes data read from memory partitions M0-M3 in a cyclic manner, such that read data is routed from different memory partitions during successive cycles of a 1 GHz local bit clock signal, and such that data output multiplexer 215 routes data from a particular memory partition, at most, once in every four cycles of the 1 GHz clock signal.

The 72-bit read data values routed by data output multiplexer 215 are provided to read-modify-write (RMW) logic 220 and chip output interface 205, as illustrated. As described in more detail below, RMW logic 220 may modify read data values provided by data output multiplexer 215, thereby implementing specific I/O transactions (i.e., read-modify-write). RMW logic 220 can include one or more arithmetic logic units (ALU), that are centrally located with scheduled access or that are distributed and slaved to given memory partitions. Although access logic block 203 is shown including instruction decode and dispatch logic 210 and RMW logic 220, it is understood that access logic block 203 may also include other conventional logic, including, but not limited to, a serial peripheral interface, error registers, a JTAG interface, BIST circuitry and/or fuses.

Chip output interface 205 receives the 72-bit read values provided by data output multiplexer 215, and in response, generates 80-bit output frame values. For example, chip output interface 205, may add a layer ID bit, a packet ID bit, and a 6-bit CRC value to the received 72-bit read values to create 80-bit output frame values. Chip output interface 205 may also perform administrative activities, which may include maintaining a transmitted frame count and storing transmitted frame information in a replay buffer for possible re-transmission.

The 80-bit output frame values provided by chip output interface 205 are routed to SerDes PHY 206. In response, SerDes PHY 206 performs lane initialization, striping, serializing, scrambling and per lane CRC on the received 80-bit output frame values. SerDes PHY 206 provides the resulting 80-bit frame values to serial links $FA_0[7:0]$ and/or $FA_1[7:0]$ over a period of ten cycles (i.e., at a frequency of 1 GHz). Note that if only one 80-bit output frame value needs to be returned to accessing device 101 (because only one 72-bit read data value was previously retrieved from one of the memory partitions M0-M3), then this 80-bit output frame value is transmitted over 8 serial links (e.g., $FA_0[7:0]$) over a period of ten cycles.

Figure 2B:
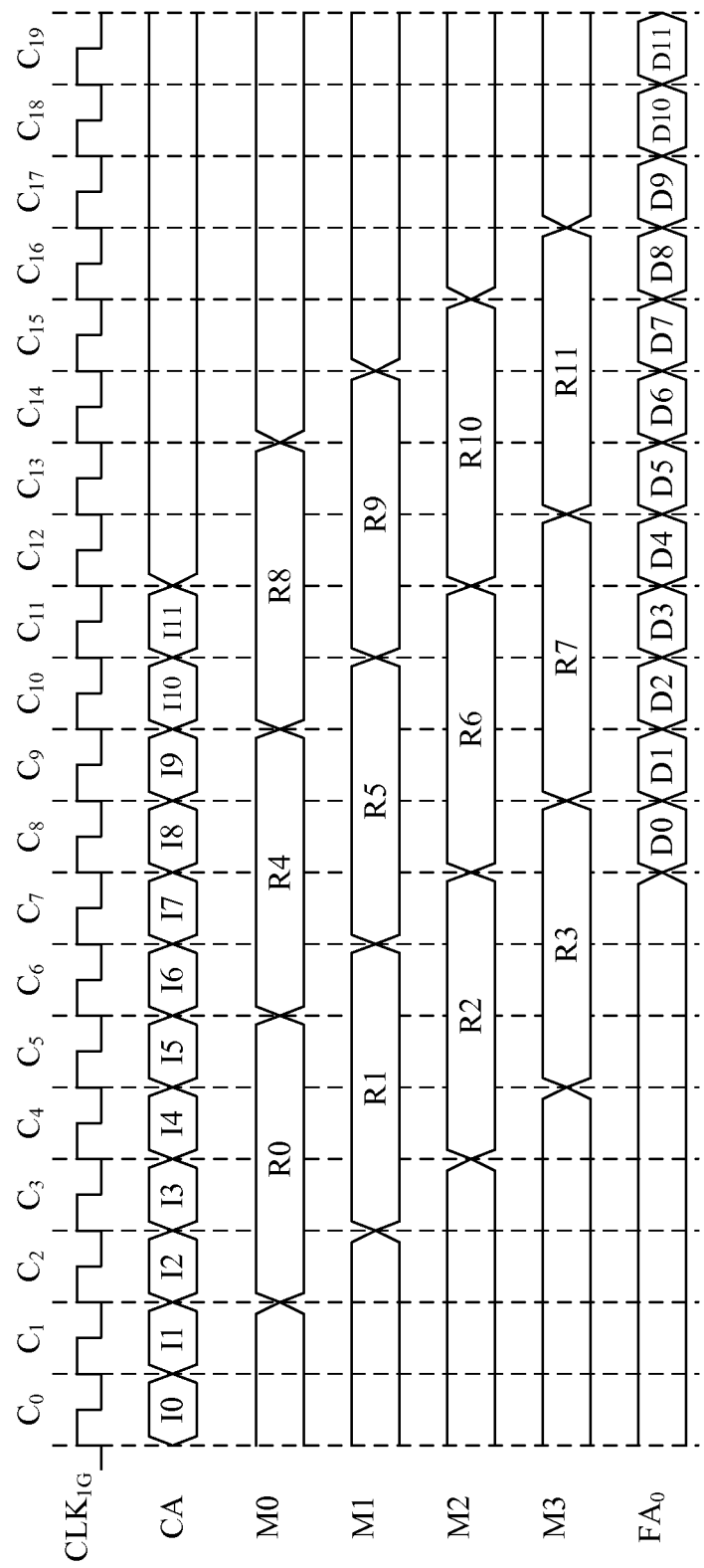
FIG. 2B is a waveform diagram that illustrates the manner in which the multi-partition memory system of FIG. 2A is accessed in accordance with one embodiment of the present invention.

FIG. 2B is a waveform diagram illustrating cyclic overlapping accesses to memory partitions M0-M3 in accordance with one embodiment of the present invention. As illustrated in FIG. 2B, read instructions I0-I11 are provided on serial links CA[7:0] at a frequency of 1 GHz. More specifically, read instructions I0-I11 are provided during cycles C0-C11, respectively, of a 1 GHz clock signal CLK1G. Read instructions I0-I11 specify memory partitions M0-M3 in a cyclic manner, such that each memory partition is accessed once every four cycles of the clock signal CLK1G. In the illustrated example, read instructions I0, I4 and I8, which specify memory partition M0, are provided during time slots defined by cycles C0, C4 and C8; read instructions I1, I5 and I9, which specify memory partition M1, are provided during time slots defined by cycles C1, C5 and C9; read instructions I2, I6 and I10, which specify memory partition M2, are provided during time slots defined by cycles C2, C6 and C10; and read instructions I3, I7 and I11, which specify read operations to memory partition M3, are provided during time slots defined by cycles C3, C7 and C11.

Read operations R0-R11 are performed within memory partitions M0-M3 as illustrated, wherein each read operation is performed over four cycles of the clock signal $CLK_{1G}$ (i.e., at a frequency of 250 MHz). Read operations within different memory partitions M0-M3 are performed in an overlapping manner. For example, read operations R0, R1 and R2 are all being performed during cycle $C_5$ within memory partitions M0, M1 and M2, respectively. In the waveform diagram of FIG. 2B, a two cycle delay exists between the time that the read instructions I0-I11 are received on serial links CA[7:0] and the time that the corresponding read operations are initiated. However, it is understood that other delays may exist in other examples.

The read data values D0-D11 associated with read operations R0-R11, respectively, are routed through data output multiplexer 215 and are provided on serial links $FA_0[7:0]$ during cycles $C_8$-$C_{19}$, respectively, at a frequency of 1 GHz. In the waveform diagram of FIG. 2B, a two cycle delay exists between the time that the read instructions I0-I11 are completed within memory partitions M0-M3 and the time that the corresponding read data values are provided on serial links $FA_0[7:0]$. However, it is understood that other delays may exist in other examples.

As illustrated by FIG. 2B, each access to memory device 102 has a fixed access latency. Thus, in the illustrated example, the accessing device 101 will receive a read data value on serial links $FA_0[7:0]$ eight cycles (of the $CLK_{1G}$ signal) after transmitting a read instruction on serial links CA[7:0].

Other methods of operating multi-partition memory core 125 are described in more detail in commonly owned, co-filed U.S. patent application Ser. No. 12/697,132, to Richard S. Roy, titled "HIERARCHICAL ORGANIZATION OF LARGE MEMORY BLOCKS", which is hereby incorporated by reference in its entirety.

Figure 3A:
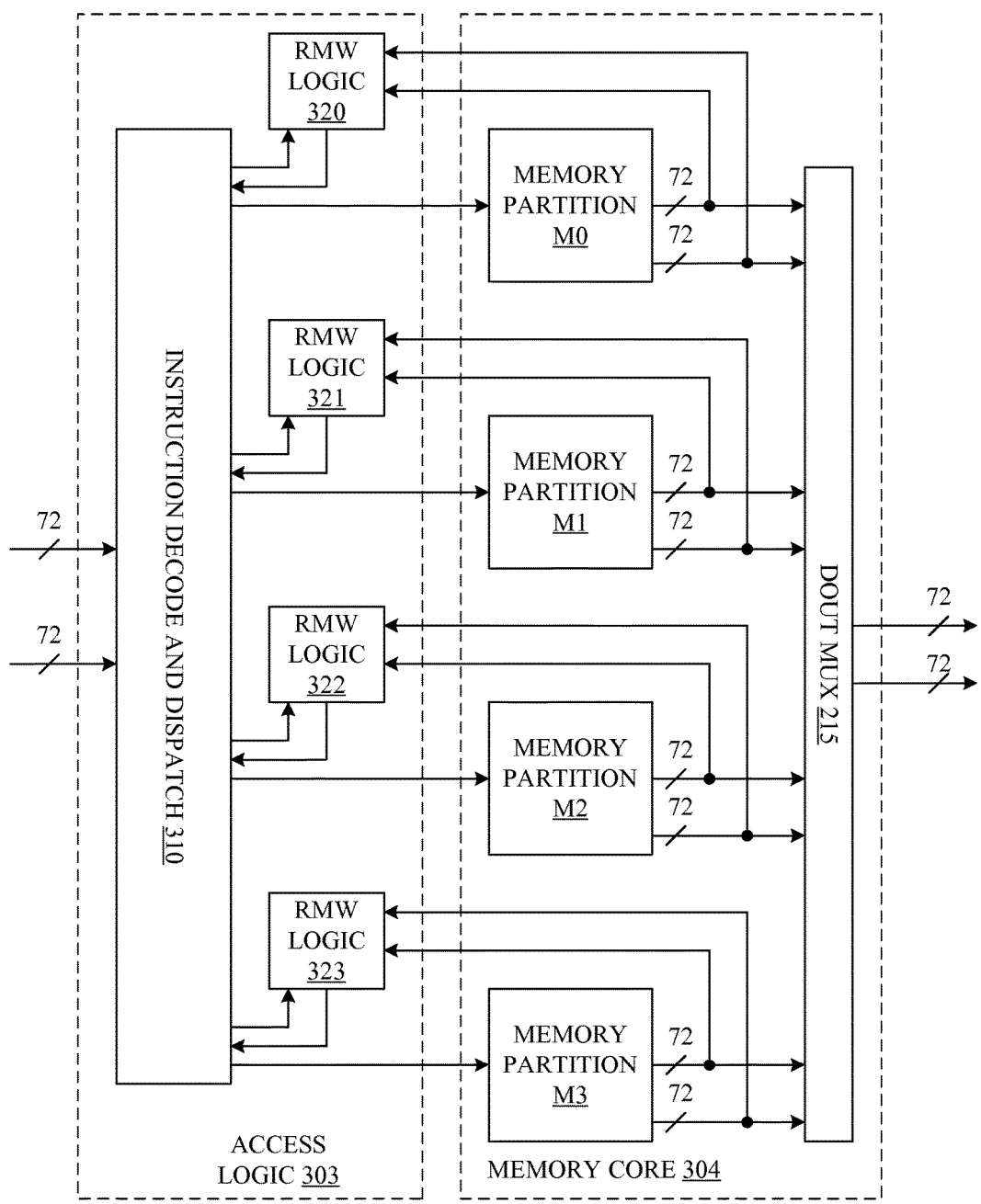
FIG. 3A is a block diagram that illustrates access logic and a memory core, which may replace the access logic and memory core of FIG. 2A in accordance with one variation of the present invention.

FIG. 3A is a block diagram that illustrates access logic 303 and memory core 304, which may replace access logic 203 and memory core 125 (of FIG. 2A) in accordance with one variation of the present invention. In this variation, each of memory partitions M0-M3 has a corresponding RMW logic block 320-323, respectively. RMW logic blocks 320-323 are coupled to receive the 72-bit read data values read from memory partitions M0-M3. As a result, RMW logic blocks 320-323 can operate in a cyclic overlapping manner (under the control of instruction decode and dispatch logic 310), thereby alleviating potential bottlenecks that might be introduced by a single RMW logic block (e.g., RMW logic block 220) that services all of memory partitions M0-M3. Viewed another way, each of RMW logic blocks 320-323 may operate at the same frequency as the corresponding memory partitions M0-M3 (e.g., 250 MHz), while RMW logic block 220 is required to operate at the same frequency as instruction decode and dispatch logic 210 (e.g., 1 GHz). The RMW logic 321-323 for all embodiments includes at least one arithmetic logic unit (ALU) and in another embodiment includes multiple ALUs that can be shared resource or slated individually to a partition or group of partitions of memory, M0-M3.

In the present embodiment, the access logic 303 and memory core 304 that comprise the integrated circuit have a surface area, or transistor ratio of at least forty percent or greater memory core 304 of the overall surface, or die, area or transistor count of the IC. In other embodiments, the ratio is at least fifty percent, or at least sixty percent. The IC primarily functions as a memory device, though it has substantial computing power to offload burden from a host processor for performing less complicated, and routine tasks such as statistics, metering, incrementing, etc. In another embodiment, any of the functions described herein is applicable to a device that is primarily a processor, or co-processor, having a substantially greater amount of logic than memory on the die.

Figure 3B:
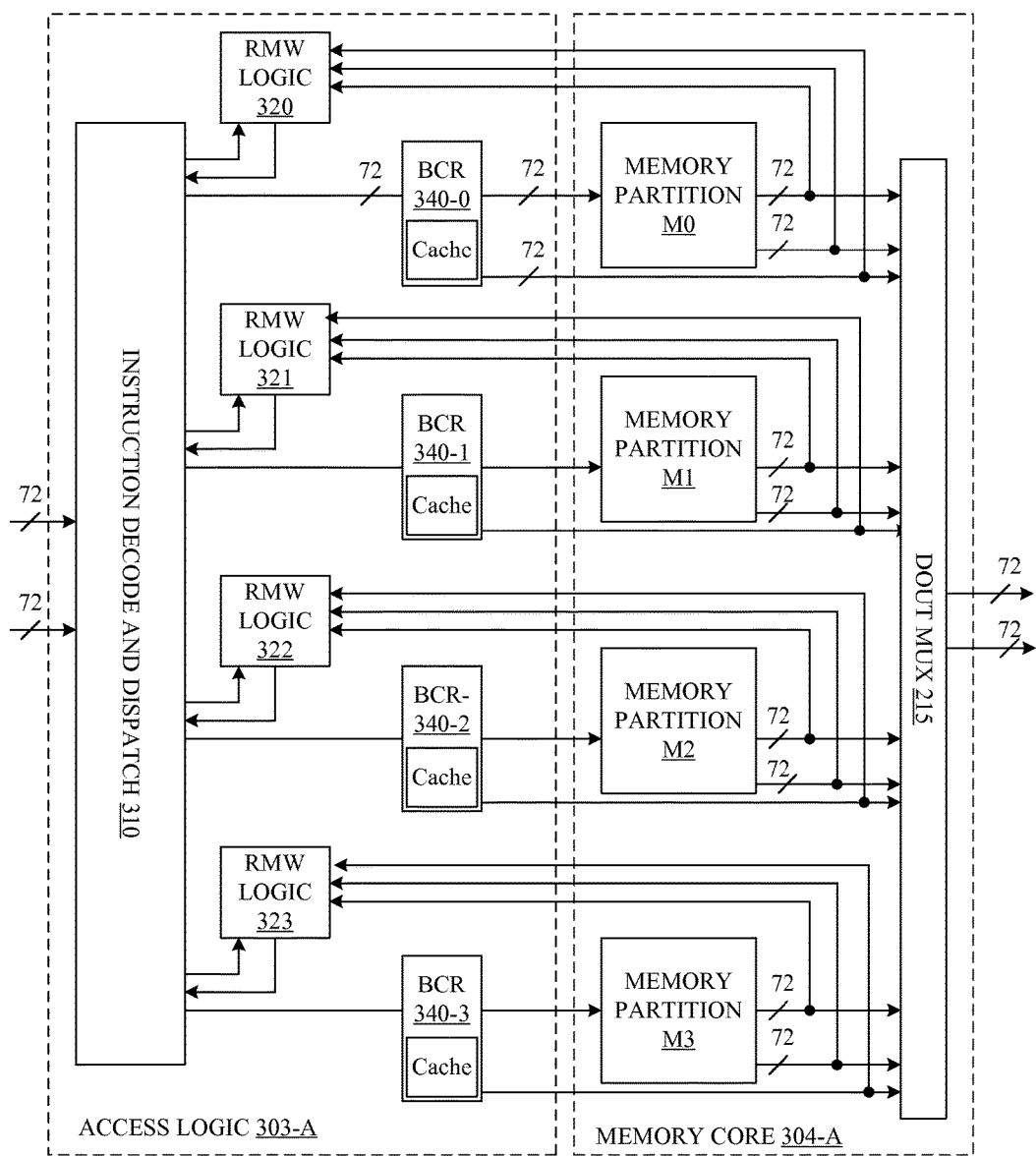
FIG. 3B is a block diagram that illustrates an alternative access logic and a memory core that provides random access memory (RAM) performance using non-RAM cells in accordance with one variation of the present invention.

FIG. 3B is a block diagram illustrating a hierarchical arrangement of multiple shared memory redundancy levels in an IC. In particular, a slated shared memory resource is located at an intermediate level, e.g., at a partition level, as shown by intermediate shared memory redundancy (ISMR) 360-363 slated to memory partitions Mo through M3, respectively. If one of the ISMR 360-363 exhausts its resources, then the IC can rely on the next higher level of SMR, the global SMR (GSMR) 250 that is available to all memory partitions M0-M3. In this manner, the life of the IC is prolonged, despite exhaustion of local or intermediate shared memory redundancy, thus reducing in-field repair and replacement, down time, loss of service, and the costs associated with it.

FIG. 3B also illustrates the use of shared memory redundancy (SMR) as simultaneously applied to different types of memory cells, according to embodiments of the disclosure. While memory partition M0-M3 use embedded DRAM, or alternatively, commodity DRAM, the cache in each of BCR blocks 340-0 through 340-3 utilize synchronous DRAM (SRAM) for faster speed and to provide multi-port functionality to the single-port memory in partition M0-M3. Thus, for example, if a memory cell has a failure, or unacceptable or marginal performance, in either the SRAM cache of BCR 340-2, and if a memory cell in eDRAM of memory core in Memory partition M2 has a failure, the unique address, based on the hierarchy level of the GBR application, of the failed bits from both types of memory, along with the correct data values for each, will be provided to GBR 250 block for substitution when the data is read out. Hence, GBR has the capability of heterogeneous redundant memory repair across any combination of memory cell constructions, whether they be DRAM, Magnetic RAM (MRAM), eDRAM, SRAM, non-volatile memory, flash, ROM, etc. GSMR 250 is coupled to BISR for optional programming of eFUSES 372.

In addition, FIG. 3B illustrates alternative access logic and memory core of a memory device that provides random access memory (RAM) performance and function using non-RAM cells in accordance with one variation of the present disclosure. The present figure includes bank conflict resolution (BCR) blocks 340-0 to 340-3 disposed between instruction decode and dispatch block 310, from which it receives data and commands, and memory partitions M0-M3, to which each BCR is respectively slaved. Output from BCR blocks 340-0, -03 are also individually coupled to the RMW logic 320-323, respectively. BCR blocks 340-0 to 340-3 include logic coupled to a RAM cache, which said cache has approximately the same quantity of addressable entries as exist for a single memory bank within memory partition M0. BCR blocks 340-0 to 340-3 run at a faster clock speed than memory cells in partitions M0, e.g., approximately twice the speed, to allow the additional operations such as comparing and routing. The addressable index locations in BCR block 340-0 are shared and available to any memory bank within partition M0. Thus, RAM performance is available to all addressable entries in all N memory banks, e.g., N=64 banks in partition M0, at a cost of a cache with a quantity of addressable entries approximately equal to one bank, e.g., 1/Nth the partition. Die size and power consumption is thereby reduced or minimized compared to traditional RAM.

In the present embodiment, BCR 340-0 provides a RAM function for memory partition M0. It does so by allowing a read command to read from memory partition M0, while selectively performing a delayed, or posted, cache write operation on the incoming data associated with a write command. Because an index in cache can be used by any memory bank in partition M0, the cache tags the memory bank number to the data residing in a given index in the cache. If an incoming write command has a same bank value as that stored in cache for the index value of the write, then the data associated with the incoming write command is overwritten to that index in the cache, thereby maintaining a most recent data value in the cache. If a conflict between a read command and a write command to memory partition M0 arises, then write data will be written to cache even if data in cache at that write index location is to a different bank number. Thus, a read/write conflict can result in the eviction of data residing in the cache. The evicted data from cache is written simultaneously with the read command operation. That is the evicted data is written from registers in cache, used in the compare operation, to the appropriate bank and index to which the evicted data belongs. The bank to which the evicted data belongs is guaranteed to not conflict with the bank to which the read command is writing, else the data would not have been evicted from cache, but would have been overwritten. Data can reside in cache indefinitely if never evicted, and can be the most recent data indefinitely, if never updated. As a final check, BCR 340-0 outputs a read for the same index as the incoming read to BCR 340-0, allowing DOUT MUX 215 to compare and select the most recent data, (cache data is more recent than memory bank, if the bank numbers of read and cache match for the given index). Latency arising from the present operation is one memory access cycle for the write command. More detail on bank conflict resolution is presented in commonly owned U.S. patent application Ser. No. 13/841,025 to Michael Miller, et al, and entitled "MEMORY WITH BANK-CONFLICT-RESOLUTION (BCR) MODULE INCLUDING CACHE," previously incorporated by reference in its entirety.

Figure 3C:
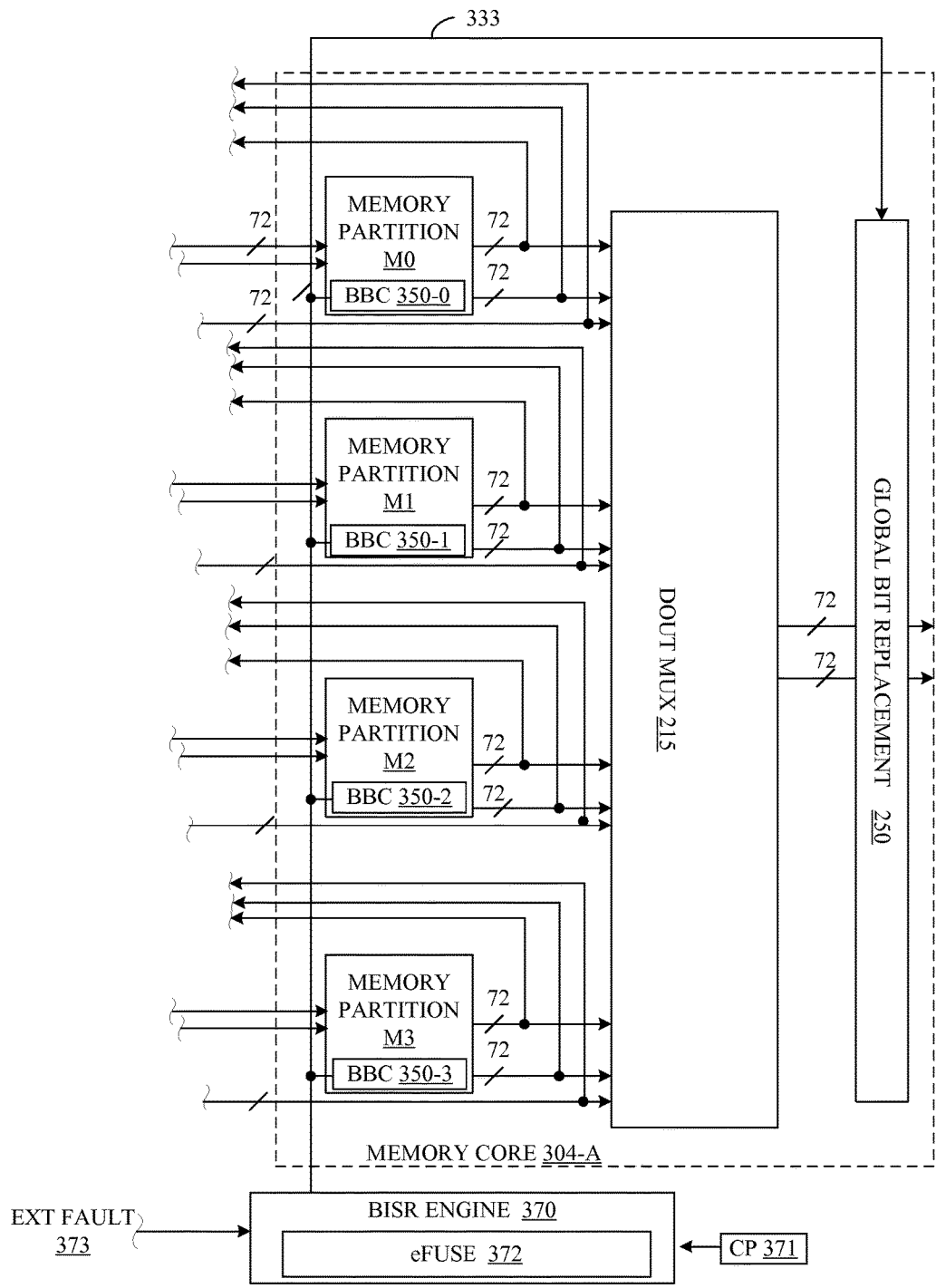
FIG. 3C is a block diagram that illustrates an alternative access logic and a memory core that provides built-in self-test (BIST) and built-in self-repair (BISR) for production testing and in-field repair (IFR) in accordance with one variation of the present invention.

FIG. 3C is a block diagram that illustrates an alternative access logic and memory core of a memory device that provides built-in self-test (BIST) and built-in self-repair (BISR) for production testing and in-field repair (IFR) in accordance with one variation of the present invention. The present figure includes a BIST background controller (BBC) 350-0 to 350-3 slaved to each respective memory partition M0-M3. Coupled to BBC 350-0 to 350-3 is a memory BISR (MBISR) engine 370 having an eFUSE block 372 disposed therein. On-die charge pump 371 is coupled to eFUSE block 372 to provide sufficient voltage boosting in the field such that, with a traditional power supply, charge pump 371 can generate a voltage level above a threshold to program an Efuse.

Serial interface couples external automatic test equipment or host to input parameters for BIST and BISR to BISR engine 370, via microcontroller 375. Once a fault is detected, whether by production-level automatic test equipment (ATE), in the field background BIST, or an external in-field source, an eFUSE can be programmed in eFUSE block 372. The eFUSE block can be partitioned with appropriate amount of fuse resources divided between production test and in-field repair, the latter being a fraction of the former in the present embodiment. The faulty cell address information is thus captured in non-volatile memory (NVM), such as hard coded eFUSES. In turn, this address information is provided to registers that subsequently relay it as control data to operate multiplexers in the data stream that redirect reads or writes to replacement addresses. The captured information includes failures repaired by both half-column replacements in the field using local redundant memory, or single or multi-cell failures repaired by GBR. The host device or the on-die device can use a default protocol to record these values, or can selectively record the repair data based on other inputs and metrics. The BISR can selectively replace faulty memory cells, or row or columns of memory cells, caused by transistor faults, sense amp malfunction, or some other hardware that affects the reliability of the stored data. The in-field repair can be initiated by memory device 101 via BIST or via an external link 373, e.g., from access device 101 that determines a faulty memory from its own BIST and then communicates the address location and type of fault via an interface to memory device, e.g., data interface, I2C, SPI, JTAG, etc., to BISR engine 370. BISR engine 370 includes logic to initiate an eFUSE programming operation. A programmed eFUSE will then configure either a MUX to redundant memory resources, e.g., a block of redundant memory cells, inside memory partition M0-M3, as needed, or a MUX in global bit replacement block 250 that screens data output from memory partition via DOUT MUX 215 for a matching address to a memory cell(s) that are faulty and have been replaced. The BBC and the BIST algorithm are described in more detail in subsequent FIG. 8. Global bit replacement block 250 can either be disposed downstream of DOUT MUX 215, in which case it would have to run at four times the rate of the individual partitions, or it can be disposed and distributed within DOUT MUX 215 and operate at the lower speed of the individual partitions.

FIG. 3C utilizes GBR 250 on a homogenous type of memory construction of the memory core in each of memory partition, M0-M3, whether that memory construction is embedded DRAM, commodity DRAM, SRAM, flash memory, etc.

Figure 3D:
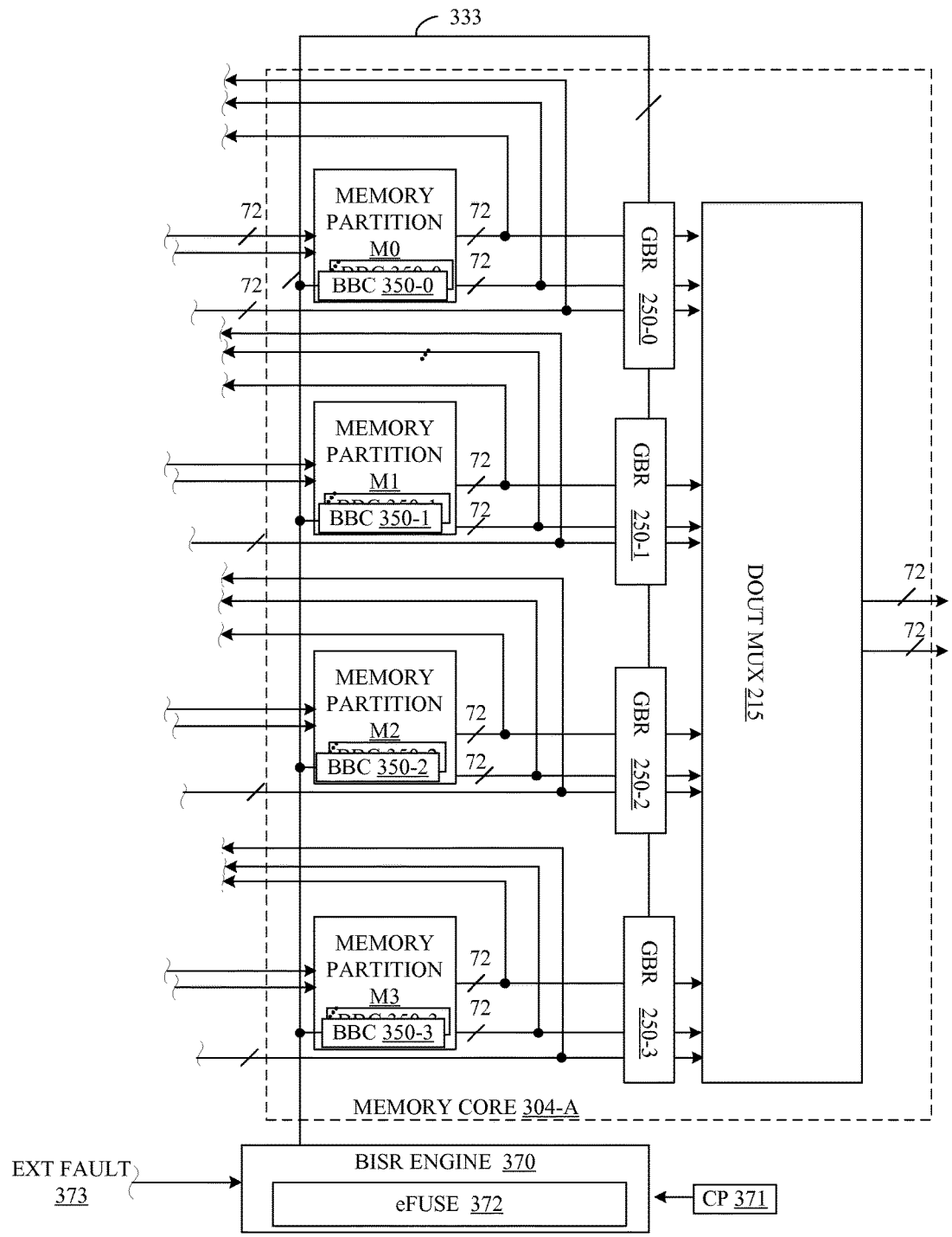
FIG. 3D is a block diagram that illustrates an alternative granularity of the BBC to each bank in a partition and a GBR block for each partition in the memory, according to various embodiments of the present invention.

While FIG. 3C illustrates a single GSMR 250 for the four partitions, any granularity of GBR can be used, including a BBC 350-0 through 350-3 for each bank within each partition, respectively. In addition, the GBR block 250-0 through 250-3 can be slated to each partition, respectively, as shown in FIG. 3D, with an optional hierarchical GBR filtering the output from all the partitions. More detail on the hierarchy of the memory core used in the present embodiment is provided in commonly owned U.S. patent application Ser. No. 12/697,141 to Michael Miller et al, and entitled: "HIGH UTILIZATION MULTI-PARTITIONED SERIAL MEMORY," which is hereby incorporated by reference in its entirety.

The prior figures primarily show the data flow through the memory device, and omit control lines for clarity, with their operation being understood by one of ordinary skill in the art, as to create the data flow. The operation of memory device 102 will now be described in connection with specific instructions.

More detail on global bit, or shared memory, redundancy is presented in commonly owned U.S. patent application Ser. No. 14/031,031 to Dipak K. Sikdar, entitled "SHARED MEMORY REDUNDANCY," that was previously incorporated by reference in its entirety.

Figure 4:
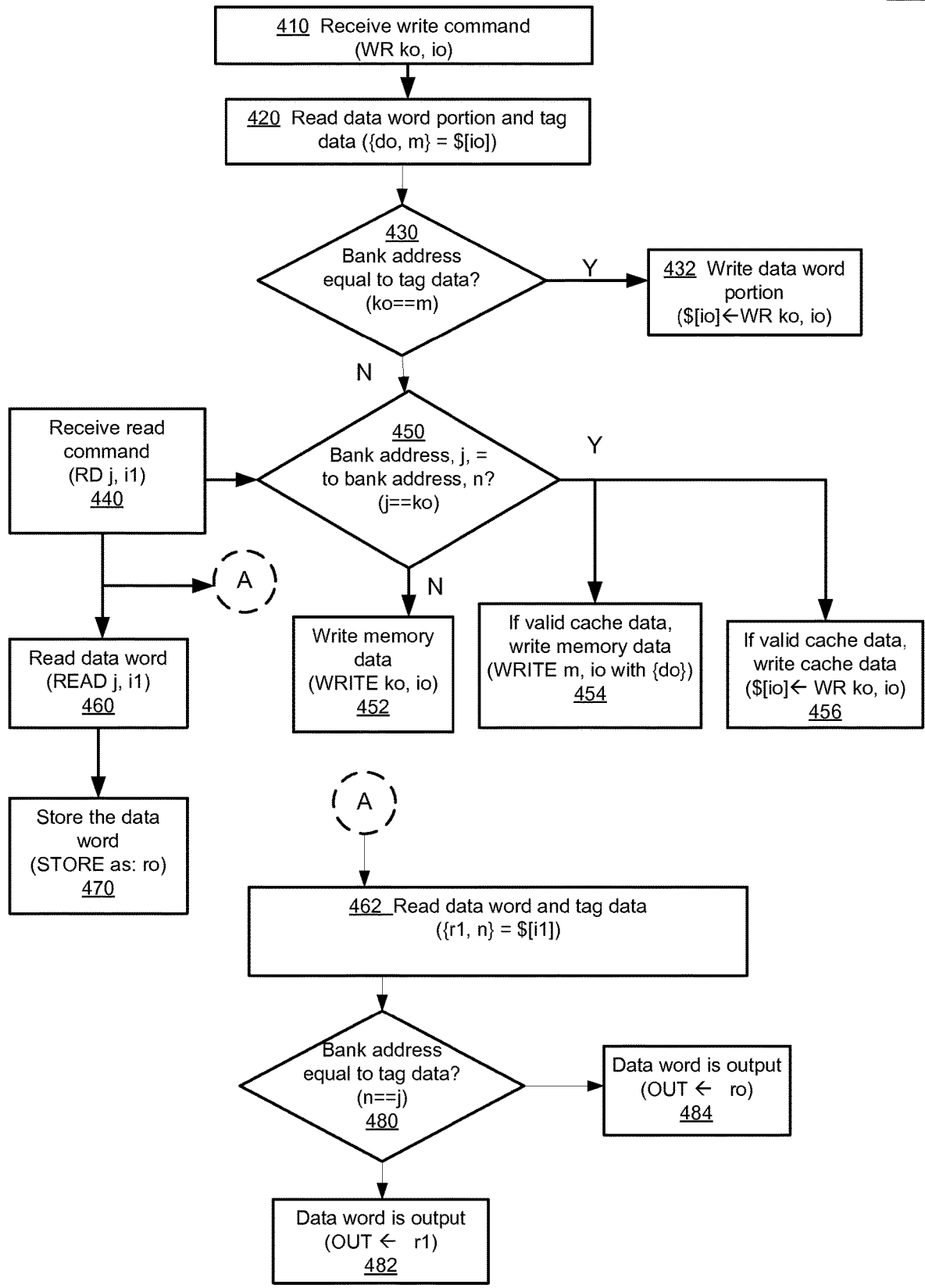
FIG. 4 is a flow chart illustrating the method of operating the memory with BCR module of FIGS. 1 and 5, in accordance with embodiments of the present invention.
Figure 5:
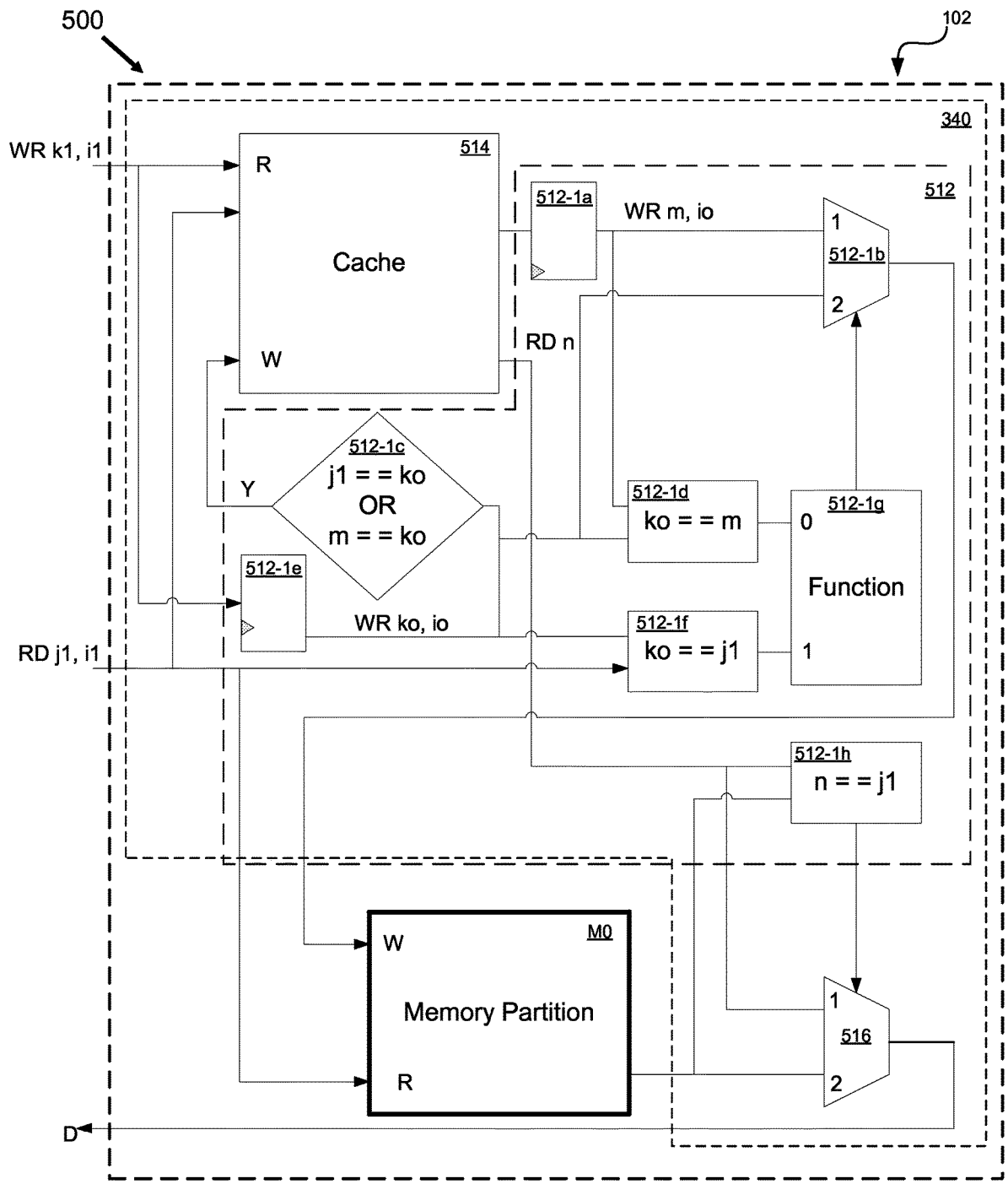
FIG. 5 is a detailed block diagram of the memory with the BCR module, in accordance with embodiments of the present invention.

Referring now to FIG. 4, a flow chart 400 is shown that illustrates the method of operating the memory device 102 with BCR module 340, in accordance with embodiments of the present invention. Embodiments of memory device are depicted in FIGS. 1 and 5.

At 410, a write command is received. For example, a write command (e.g., notation WR ko, io) is received to write a data word to a memory location M0 n, j at bank address n (e.g. notation, ko) and index j (e.g. notation, io) in the memory partition M0.

At 420, read data word portion and tag data are read. For example, the data word portion 214$i$-1 (e.g. notation, do) and the tag data 214$i$-2 at cache location 514$i$ (e.g. notation, io) are read from the cache 514 (e.g. notation of entire step, {do, m}=$[io]).

At 430, it is determined if the bank address is equal to the tag data. For example, the condition is tested whether the bank address, n, of the memory location M0$n$, j (e.g. notation, ko) of the write command, is equal to the tag data 214$i$-2 (e.g. notation, m) at cache location 514$i$ (e.g. notation of entire step, ko==m).

If the bank address, n, of the memory location M0$n$, j, of the write command, is equal to the tag data 214$i$-2 at cache location 514$i$, then, at 432, write the data word portion. For example, the data word portion 214$i$-1 of the cache data 214$i$ is written to a merge-modify write operation with the data word (e.g. notation, [DATA-Wo]) of the write command (e.g. notation of entire step, $[io]←WR ko, io).

At 440, a read command is received. For example, a read command (e.g. notation, RD j, i1) is received to read a data word from a memory location at a bank address (e.g. notation, j) and index (e.g. notation, i1) in the memory partition M0 (e.g. notation of entire step, RD j, i1)

The read command information is made available to the next operation 450. If the bank address, n, of the memory location M0$n$, j of the write command, is not equal to the tag data 214$i$-2, at cache location 514$i$, then, at 450, it is determined if the bank address, j is equal to bank address, n. For example, the condition is tested whether the bank address, given by j of the read command, is equal to the bank address, n, of the memory location 550$n$, j of the write command. (e.g. notation of entire step, j==ko)

If the bank address, j, of the read command, is not equal to the bank address, n, of the memory location 550$n$, j of the write command, then, at 452, the memory data is written. For example, the memory data 250$n$, j in memory bank 550$n$ of the write command, in memory partition 550 is written to in a write operation with the data word of the write command (e.g. notation of entire step, WRITE ko, io)

If the bank address, given by j of the read command, is equal to the bank address, n, of the memory location 550$n$, j, of the write command, then, at 454, if the cache data is valid, then the memory data is written. For example, if the cache data 214$i$ is valid, then the memory data in the memory bank given by the tag data 214$i$-2, m, in memory partition 550 is written to in a write operation with the data word portion 214-$i$, (e.g. notation, [DATA-C]), of the cache data (e.g. notation of entire step, WRITE m, io with {do}.

Also, if the bank address, given by j of the read command, is equal to the bank address, n, of the memory location 550$n$, $j$ of the write command, then, at 456 (and in parallel with operation 454), the cache data is written. For example, if the cache data 214$i$ is valid, then the cache data portion 214$i$-1 in cache location 514$i$ in cache 514 is written to in a write operation with the data word (e.g. notation, [DATA-W$o$]), of the write command (e.g. notation of entire step, $[io]←WR ko, io). The combination of operations 454 and 456 may be referred to, herein, by the term of art, "swap," or alternatively, "eviction."

At 460, the data word is read. For example, the data word (e.g. notation, [DATA-M]), from a memory location at a bank address, and index, in the memory partition 550 is read (e.g. notation of entire step, READ j, i1)

At 462, the data word and tag data are read. For example, in parallel with operation 460, a data word portion, r1, and tag data, n, at a cache location are read from the cache 514 (e.g. notation of entire step, {r1, n}=$[i1]).

At 470, the value read at 460 is stored in a register as a data word, ro. (e.g. notation of entire step, STORE as: ro).

At 480, it is determined whether the bank address is equal to the tag data. For example, the condition is tested whether the tag data, n, at the cache location read in operation 462 is equal to the bank address, j, of the memory location given by j of the read command, READ j, i1 (e.g. notation of entire step, n==j).

At 482, if the tag data, n, at the cache location read in operation 462 is equal to the bank address, j, of the memory location given by j of the read command, RD j, i1, then the data word, r1, is output in response to the read command, RD j, i1 (e.g. notation of entire step, OUT←r1).

At 484, the data word is output. For example, if the tag data, n, at the cache location read in operation 462 is not equal to the bank address, j, of the memory location given by j of the read command, READ j, i1, then the data word, ro, is output in response to the read command, RD j, i1 (e.g. notation of entire step, OUT←ro).

With reference now to FIG. 5 and further reference to FIG. 4, in accordance with embodiments of the present invention, a detailed block diagram 500 is shown of the serial memory device 102 with the BCR module 340. As shown in FIG. 5, the serial memory device 102 with BCR module 340 includes a memory partition M0.

The BCR module 340 includes a bank-conflict resolver 512 that includes BCR logic, a cache 514, and a read-output multiplexer 516.

The bank-conflict resolver 512 includes various blocks of circuitry. For example, blocks 512-1$a$-$h$ will be described in further detail below.

The operation of the serial memory device 102 with BCR module 340 shown in FIG. 5 may be explained with the aid of the flow chart 400 of FIG. 4. Throughout the following discussion, the subscripts of indices may differ from those previous used in the description of FIG. 4. The cache 514 and a first write delay 512-1$e$ receive the new write command (e.g., WR k1, i1), at 410.

After the write delay 512-1$e$, the write command is designated by a prior write command (e.g., WR ko, io). The write command is propagated to the following: the memory partition write input multiplexer 512-1$b$, a first memory bank index comparator 512-1$d$, a second memory bank index comparator 512-1$f$, and a conditional gate 512-1$c$.

After the cache receives the write command, at 420, the cache reads cache data from the cache location (indexed by io), and outputs the data word portion, {do}, along with the bank memory location index, m, and the memory location index, io, to a second write delay 512-1$a$. After the delay, this appears on the output of the second write delay 512-1$a$ as a write command from cache, (e.g., WR m, io).

The write command from cache appears on the input of the write input multiplexer 512-1$b$ and the input of the first memory bank index comparator 512-1$d$. The write command from cache, WR m, io, and the delayed write command, WR ko, io, are received by the first memory bank index comparator 512-1$d$, if the condition, ko==m, is satisfied, at 432, the cache may be written with the delayed write command, WR ko, io.

With further reference to FIG. 4 and FIG. 5, in accordance with embodiments of the present invention, the cache 514 and the second memory bank index comparator 512-1$f$ receive the read command, RD j1, i1, at 440.

If the condition tested by the first memory bank index comparator 512-1$d$, ko==m, is not satisfied, at 450, the condition, j==ko, may be tested in the conditional gate 512-1$c$ and the second memory bank index comparator 512-1$f$.

If the condition, j1==ko OR m==ko, is satisfied, the cache may be merged with the delayed write command, WR ko, io, sent through the conditional gate 512-1$c$, at 456.

If the condition, j1==ko, is satisfied, and the condition, ko==m, is not satisfied, which are tested by the second memory bank index comparator 512-1$f$ and by the first memory bank index comparator 512-1$d$, respectively, the logic function generator 512-1$g$ receives a logical "1" from the second memory bank index comparator 512-1$f$ and a logical "0" from the first memory bank index comparator 512-1$d$, respectively. For this combination of logic values, the logic function generator 512-1$g$ sends a signal to the write input multiplexer 512-1$b$ to pass the write command from cache, WR m, io, appearing on input 1 of the write input multiplexer 512-1$b$ to be written to the memory partition M0, at 454, if the cache data is valid in the write command from cache, WR m, io. The combination of operations 452 and 454, just described, constitute the "swap" previously described.

If the condition, j1==ko, is not satisfied, and the condition, ko==m, is not satisfied, which are tested by the second memory bank index comparator 512-1$f$ and by the first memory bank index comparator 512-1$d$, respectively, the logic function generator 512-1$g$ receives a logical "0" from the second memory bank index comparator 512-1$f$ and a logical "0" from the first memory bank index comparator 512-1$d$, respectively. For this combination of logic values, the logic function generator 512-1$g$ sends a signal to the write input multiplexer 512-1$b$ to pass the delayed write command, WR ko, io, appearing on input 2 of the write input multiplexer 512-1$b$ to be written to the memory partition M0, at 452.

With reference now to FIG. 5 and further reference to FIG. 4, in accordance with embodiments of the present invention, the function of component parts of the serial memory 102 with BCR module 340 operations associated with the read command, RD j1, i1, are next described.

The read command, RD j1, i1, appears on the inputs to the cache 514 and the memory partition M0, at 440. The memory partition is read at bank location index, j1, and memory location index, i1, at 460.

After the cache receives the read command, RD j1, i1, at 462, the cache reads cache data from the cache location indexed by i1, and outputs the data word portion, {r1}, along with the tag data, n, as cache read data, RD n, output to input 1 of the read-output multiplexer 516, and an input of a third memory bank index comparator 512-1h.

At 470, the memory partition outputs the data word, ro, stored at bank location index, j1, and memory location index, i1, along with the bank memory location index, j1, to input 2 of the read-output multiplexer 516, and the other input of the third memory bank index comparator 512-1h. The cache read data, RD n, output from cache, and the read data output from the memory partition M0, are received by the third memory bank index comparator 512-1h, and the condition, n==j1, is tested, at 480.

If the condition, n==j1, is satisfied, at 482, the read-output multiplexer 516 receives a signal to pass through the data word portion, r1, of the cache read data, RD n.

If the condition, n==j1, is not satisfied, at 484, the read-output multiplexer 516 receives a signal to pass through the data word, ro, of the read data output from the memory partition M0.

In various embodiments, error correction operation may be applied to data received by, or sent by, the serial memory device 102. For example, an error correction code is generated on a data word of a write command and/or an error correction is performed on cache data of a data word portion of the cache data.

In accordance with embodiments of the present invention, a memory device 102 may include at least one memory partition M0 with BCR module 340. For example, each serial memory includes a memory partition and a dedicated BCR module. Thus, the BE includes a plurality of memory a plurality of partitions. By way of example, the number of memory partitions may be four. By way of example, one memory partition M0 may include memory banks 152a, 152n.

In addition to the component parts of the serial memory device 102 with BCR module 340 described herein, the memory M0 further includes array manager circuitry coupled to the plurality of memories with BCR module, and serializer/deserializer (SerDes) interfaces coupled to the array manager circuitry.

Figure 6A:
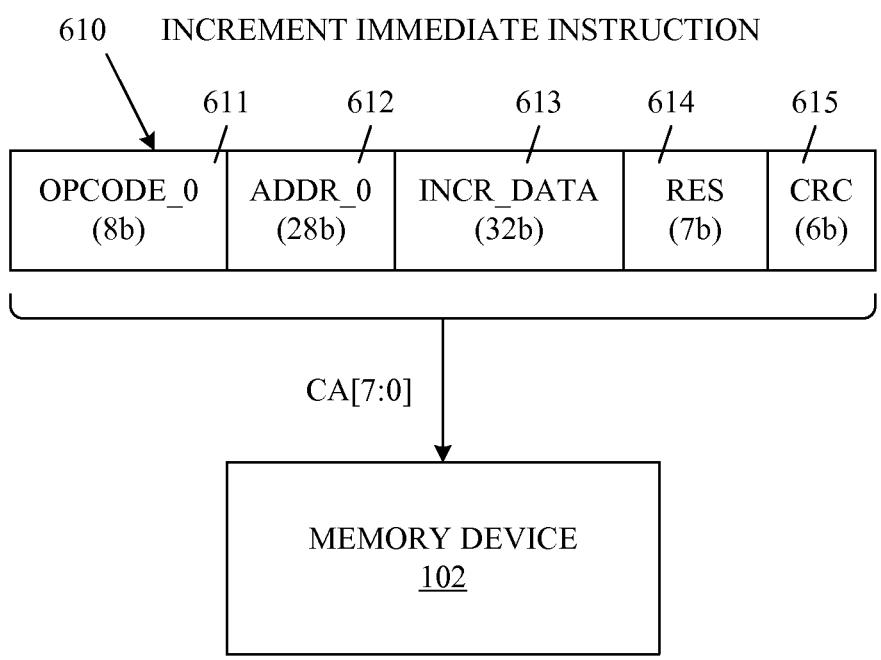
FIG. 6A is a block diagram illustrating an increment immediate application in accordance with another embodiment of the present invention.

FIG. 6A is a block diagram illustrating an increment immediate application in accordance with another embodiment of the present invention. The increment immediate application can provide for efficient statistics control (e.g., an increment/decrement function). An increment immediate instruction 610 allows the accessing device 101 to increment/decrement values stored in memory device 102 in an efficient manner. The increment immediate instruction 610 includes an 80-bit value, which can be provided to memory device 102 on serial links CA[7:0] over ten cycles (i.e., at a frequency of 1 GHz). The 80-bit increment immediate instruction 610 includes an 8-bit read-modify-write command 611, a 28-bit transaction address 612, a 32-bit immediate value 613, 7-bit reserved field 614, and a 6-bit CRC value 615.

The 80-bit increment immediate instruction 610 is processed by SerDes PHY 201 and chip input interface 202 in the manner described above, such that instruction decode and dispatch logic 210 receives the 8-bit read-modify-write command 611, the 28-bit transaction address 612, and the 32-bit immediate value 613. In response, instruction decode and dispatch logic 210 initiates a read operation. This read operation causes a 72-bit read data value to be read from one of the memory partitions M0-M3, from the address specified by transaction address 612. This 72-bit read data value is routed through data output multiplexer 215 to RMW logic 220. RMW logic 220 also receives the immediate value 613 from instruction decode and dispatch logic 210. RMW logic 220 adds the immediate value 613 to the retrieved 72-bit read data value, thereby creating a modified 72-bit data value. Instruction decode and dispatch logic 210 then performs a write operation, wherein the modified 72-bit data value is written back to memory core 125, at the address specified by transaction address 612. Because the increment immediate instruction 610 requires two successive accesses (read then write) to the memory partition identified by the transaction address 612, the accessing device 101 must not access this memory partition again until after the modified data value has been written back to the specified memory partition. In the described example, the operations specified by the increment immediate instruction 610 are completed at a frequency of 125 MHz (i.e., one read operation at 250 MHz and one write operation at 250 MHz).

In another embodiment, multiple counters disposed in memory, can be updated simultaneously or sequentially based on a single command operation received from an access device. If multiple counters have a fixed or deterministic relationship with each other, or another deterministic state, known within memory system 102, then a single command to update one of the counters can result in an update of one or more of the other counters. For example, if an external command to update a first statistic counter for byte count within a packet is received by memory device, then the memory device knows that the packet count must be updated by one. Thus, a separate command from access device to update the packet counter is unnecessary. As a result, this embodiment can reduce traffic by an additional fifty percent above the reduction in traffic between access device and memory device from a RMW. If more than one type of counter is impacted, then the reduction in traffic is further scaled. In another embodiment, traffic rate is monitored by memory device.

In another embodiment, the traffic metering operation is managed by the memory device, using the existing on-chip system clock signal in combination with the byte usage provided by the access device. The memory device calculates the traffic rate and manages a token bucket, drawing out tokens for usage until a threshold is reached at which point the response to the access device will have a different color-coding indicating the status of the packet, for which the access device can accept or override using its own algorithms. Thus, a hierarchical algorithmic traffic monitoring system is created, with the memory device operating as the primary traffic police, and the access device as the master traffic police. More detail on multiple counter operations and traffic management is presented in commonly owned U.S. patent application Ser. No. 13/911,999 to Man Kit Tang, entitled "MEMORY DEVICE WITH AN EMBEDDED LOGIC UNIT" which was previously incorporated by reference in its entirety.

As described in more detail below, the increment immediate instruction 610 advantageously allows read-modify-write operations to be performed within memory device 102, without burdening accessing device 101 or the interface between accessing device 101 and memory device 102.

Figure 6B:
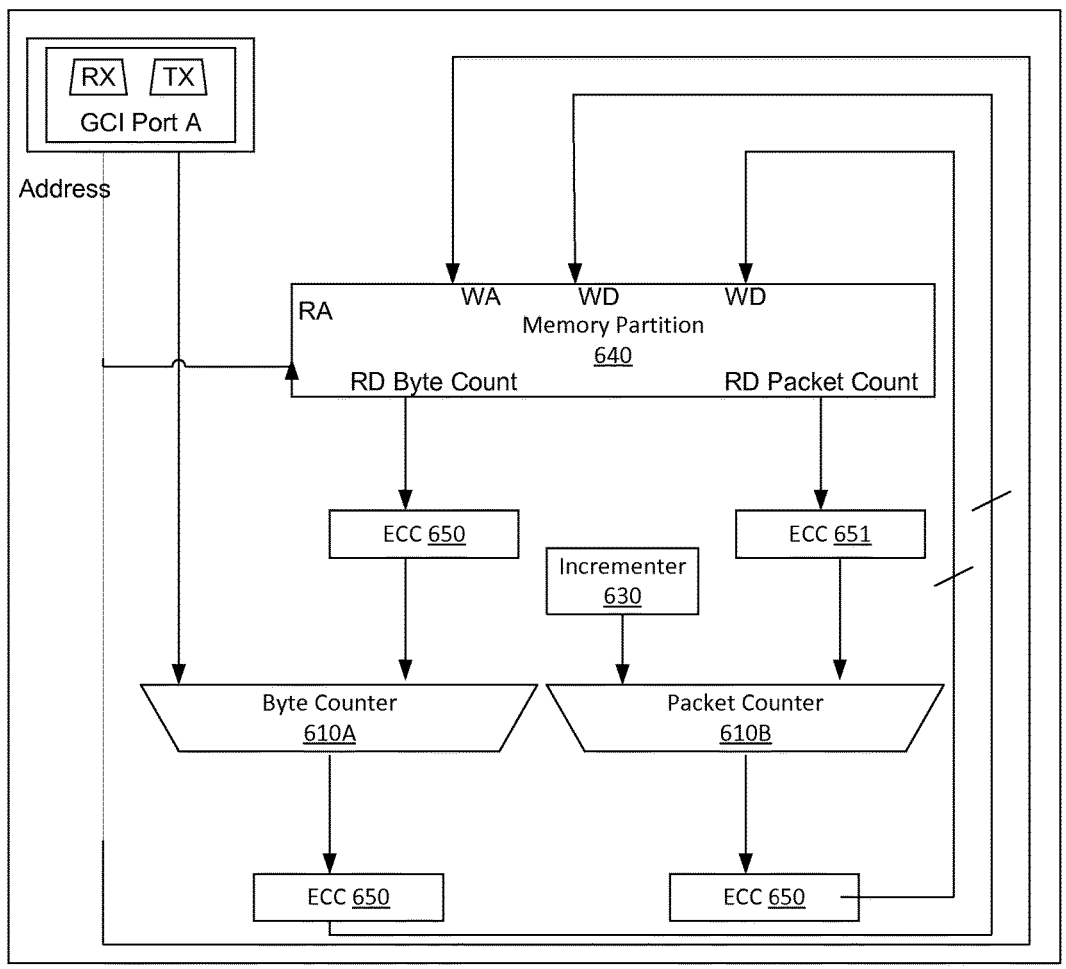
FIG. 6B is a block diagram illustrating a statistics counter application in accordance with another embodiment of the present invention.
Figure 6C:
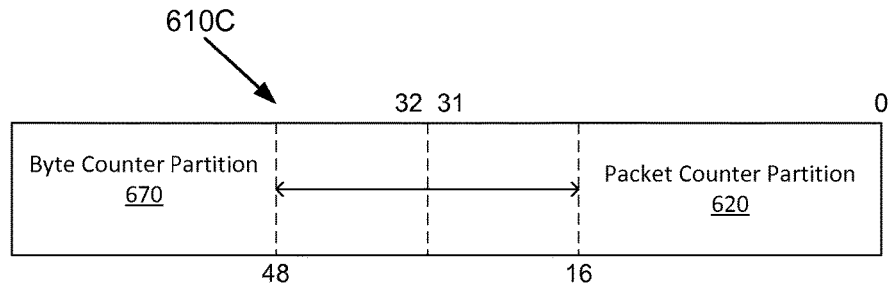
FIG. 6C is a block diagram of an example programmable partitionable counter, according to various embodiments.

Referring now to FIG. 6B, a block diagram illustrating a statistics counter application is shown, while FIG. 6C, a block diagram of an example programmable partitionable counter in accordance with another embodiment of the present invention. In some embodiments, when a packet is received memory core 125, statistics are updated. Statistics may comprise a number of bytes received and/or a number of packets received. A packet, received at accessing device 101, may contain statistics such as, but not limited to, a size, an address (or user identification), and a command. When a packet is received at accessing device 101, a command is sent to memory device 102 that contains a counter address and byte count value. The memory device 102 reads from the memory core 125 the contents of the counters (e.g., byte and packet) at the address. The counters are then incremented accordingly. For example, packet counter is incremented by one and byte counter is incremented by the number of bytes of the packet.

A packet counter 610B comprises the number of packets received by a memory core 125. A byte counter 610A comprises the number of bytes received by a memory core 125. In one embodiment, packet counters are comprised of lifetime counters, which store enough data such that the counter will continue to operate for the lifetime of the chip (e.g., 64 b, 128 b, etc.). In other words, a lifetime counter will not overflow during the lifetime of the system in which it is embedded. In some embodiments, counters smaller than lifetime counters include, but are not limited to: 32 bits, 64 bits, etc. For example, counter 610B may be designed to be reset monthly, yearly, etc. In some embodiments, a counter (byte counter 610A, packet counter 610B or both) is unique to a user, an account, a group of users, etc.

A packet received by accessing device 101 may be any size, for example, the packets may be variable sizes. The commands send to the memory device 102, from the packet processor, may comprise 72 bits, wherein the command comprises 64 bits of data and 8 bits of error correcting code. In one embodiment, at least one error correcting code module (e.g., error correcting code module 650 and error correcting code module 651) is comprised in memory core 125. In addition, counters 610 are embedded in a memory chip. In one embodiment, counters 610 are remote from a memory chip.

In various embodiments, statistics (e.g., the value of packet counters 610B) are sent back to accessing device 101 every time they change. Statistics may be sent to accessing device 101 at predetermined intervals (e.g., every n times, once a day, once a month, etc.). In one embodiment, statistics are not sent to accessing device 101.

In various embodiments, after memory core 125 receives a packet with one command, a plurality of functions is performed by logic unit 120. This is sometimes referred to as a dual operations or dual updating. For example, if one piece of information is received such as packet size, then the byte counter 610A and the packet counter 610B may be changed. In other words, the packet counter 610B is changed based on the receipt of a packet size that is used in updating byte counter 610A. It should be noted that in some embodiments byte counter 610A and packet counter 610B may refer to byte counter partition 670 and packet counter partition 620 respectively (both of FIG. 6C).

As an example, when the command PDADD (Paired Double Word Add) is received as a command, the statistics are modified. For example, the operations P_COUNT=P_COUNT+1 and BYTE_COUNT=BYTE_COUNT+PACKET_SIZE are performed by logic unit 120 when a packet is received by memory core 125. Note that the size of a word can be any size including, but not limited to: 64 bits, 128 bits, etc.

Incrementer 630 may increment the packet counter 610B. It should be understood that incrementer 630 is a characterization of an action performed by logic unit 120. In one embodiment, incrementer 630 increments the packet counter by one bit. In various embodiments, incrementer 630 increments the packet counter by: a static number of bits greater than one, a programmable number of bits greater than one, a number of bits based on other parameters or statistics including packet size, or a negative number of bits. In one embodiment, counters may be incremented once every memory clock cycle. Counters may be incremented every system clock cycle. Counters may be incremented sequentially or simultaneously.

In various embodiments, to increment two lifetime counters (e.g., byte and packet) two reads and two writes are performed on 72 bit (72 b) words (e.g., 64 b+8 b ECC) for a total of four commands and 4×72 b data transferred between the processor and memory device 102. In particular, this method transfers a single 72 b command from the processor to the memory device 102. This can improve bandwidth by as much as five times, as compared to conventional systems. It is noted that memory bandwidth bottleneck between processors and memory may be limiting of producing 400 Gps and 1 Tbps network packet processors. In addition, statistics can be as much as 25 to 30% of the chip memory bandwidth.

Programmable Partitionable Counter

Counters (e.g., byte counter 610A and packet counter 610B) may be partitioned. In other words, it may be split into multiple partitions once, twice, three times, four times, or more. For example, counter 610C may be split into a byte counter partition 670 and a packet counter partition 620. FIG. 6C shows a programmable partitionable counter 610C comprising 64 bits. A user may program a partition to separate counter 610C into byte counter partition 670 and packet counter partition 620 at any position he or she chooses. For example, a user may want to partition the programmable partitionable counter 610C such that the packet counter partition 620 comprises 16 bits while the byte counter partition comprises 48 bits. FIG. 6C shows dashed lines indicating example partitions that occur between bits 15 and 16, 31 and 32, and 47 and 48. It should be noted that a partition could be smaller than 16 bits.

In one embodiment, the type of account or network contract a user has determines the size and number of partitions comprised in programmable partitionable counter 610C. Partitions may be any size, and may be variable. In some embodiments, programmable partitionable counter 610C may be programmed to split into partitions as small as 1 bit. The counters may be a fixed size so the size of a partition value will not be small, such as ATM, packets.

Programmable partitionable counter 610C may be programmed with four partitions of size s (e.g., s0, s1, s2 and s3) prior to system operation or implementation. In some embodiments, the s value is not stored in memory device 102, and instead stored in slower memory. In one embodiment, each user/account comprises only one associated value. An s value is associated with a system as opposed to a user/account. Programming entry commands e (e.g., e0, e1, e2 and e3) correspond with the s sizes. In some embodiments, an entry (e) may be used for a particular user/account that corresponds to an s value. In one example, if an e value is entered that corresponds to an value of −16 in a 64 bit counter, the packet counter partition 670 will comprise (32+(−16)) bits, while the byte counter partition 620 will comprise (32+(16)) bits. Note that programmable partitionable counter 610C may be partitioned into partitions as small as one bit (e.g., packet counter partition 620 may comprise 4 bits, while byte counter partition 670 comprises 60 bits). It should be understood, that in one embodiment, the sum of the bits in the partitions is 64. That is, for example, one partition includes 12 bits and another partition includes 52 bits for a total of 64 bits. Accordingly, the partitions can slide back forth to any desired granularity or setting. In one embodiment, one account/user may have a different s than another account/user. In other embodiments, an entry may be for multiple users or partitions. Multiple users may be grouped together based on the tasks they perform.

A counter may saturate when it reaches its maximum value. When a counter reaches its maximum value, in one embodiment, a user/account may receive a message indicating that the counter 610 is saturated and the memory core 125 cannot receive additional packets. The user/account may receive a message indicating that if additional money is paid, memory core 125 will continue to function. In one embodiment, after a counter reaches its maximum value it returns to zero.

In an embodiment, an address (sometimes referred to as a user identification (UID)) for a user/account is received so memory core 125 finds the location in the memory of the packet counter 610B and the byte counter 610A. By using an offset, the memory core 125 may find additional information associated with a user/account. For instance while an address may point to one location in the memory core 125, the address in addition to the offset will point to another location in the memory core 125 where additional information is stored (e.g., information related to metering).

In one embodiment, the programmable partitionable counter 610C may consolidate four operations into one because operations are often paired, or in other words, they are often performed at the same time. In an embodiment, the byte count is read, then the byte count is written, and the packet count may be read, and then the packet count is written. In one embodiment, an address comes in for a record, or a paired counter. In an embodiment, an address comes in, and a double word, which is 144 bits, is modified based on the address and the offset and stored in memory core 125.

In various embodiments, after data is sent to the logic unit 120 and before the resulting data is sent back to an address in memory core 125, another command is received by memory core 125 attempting to access the data at the address where the resulting data is intended to be written. At that point, the data at that address in memory core 125 is considered stale.

Figure 7:
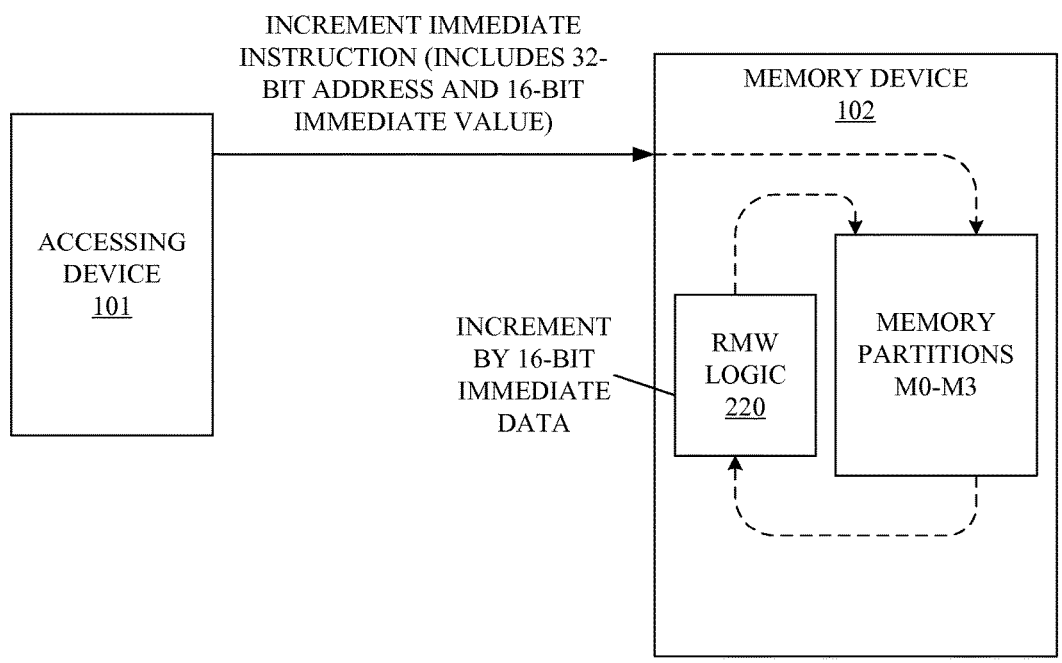
FIG. 7 is a block diagram illustrating a read-modify-write operation implemented by the increment immediate application of FIG. 6A, in accordance with one embodiment of the present invention.

FIG. 7 is a block diagram that illustrates the operation of the increment immediate instruction 610. Accessing processor 101 transmits the increment immediate instruction 610 to memory device 102. At this point, accessing processor 101 has completed its role in the operation. That is, accessing processor 101 is not required to wait for results from memory device 102 or store the immediate data. Upon receiving the increment immediate instruction 610, memory device 102 reads the memory value to be incremented from the specified address within memory partitions M0-M3, and provides this memory value to RMW logic 220. Memory device 102 also provides the immediate value included in the increment immediate instruction to RMW logic 220. RMW logic 220 adds the immediate value to the retrieved memory value to create the modified memory value. Instruction decode and dispatch logic 210 then causes the incremented memory value to be written back to the associated address within the memory partitions M0-M3. Significant savings are realized, because I/O bandwidth, power and pins are only needed to perform one memory transaction between accessing device 101 and memory device 102. The read-modify-write operation of the present example can be used for data manipulation (i.e., increment/decrement, semaphore, Boolean flag manipulation), pointer indirection for data structure walking, and/or data packing/unpacking (gearbox to match packet quanta mismatch with internal memory word length). Although RMW logic 220 has been described in connection with incrementing a counter value, it is understood that RMW logic 220 can also be used to implement other operations, including, but not limited to, pointer modification, inserting an entry into a linked list (or other linked list manipulations), performing conditional store operations, or performing look-up table operations. Memory device 102 is slaved to one or more accessing device 101, which can be a packet-processing engine, a host processor, an FPGA, a MUX/DEMUX, a network processor, a co-processor, or other line card processor.

Figure 8:
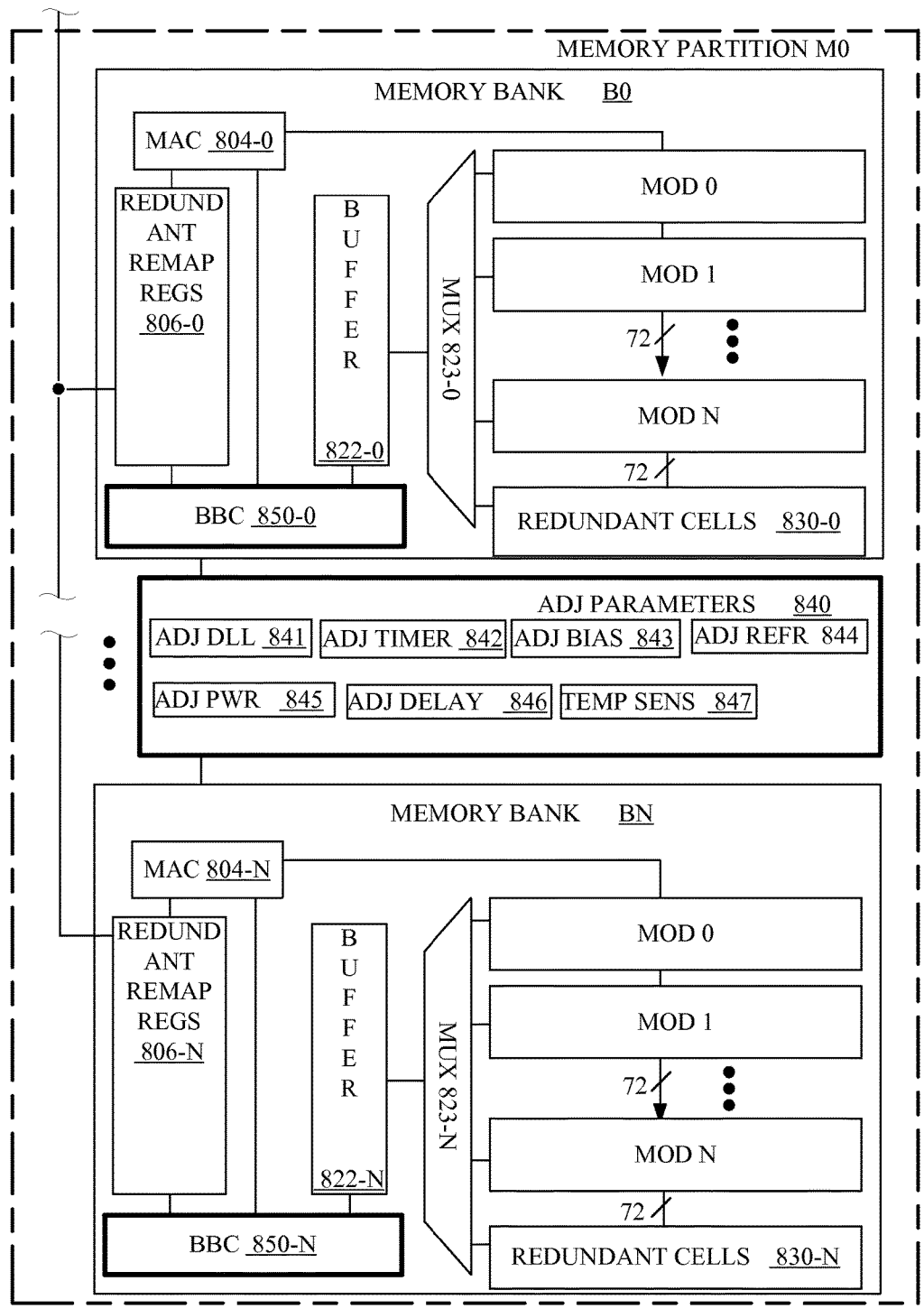
FIG. 8 is a block diagram of a memory partition with a background BIST controller (BBC) for operating continuous in-field test and repair in accordance with one embodiment of the present invention.

FIG. 8 is a block diagram of a memory partition M0 with a background BIST controller (BBC) for operating an in-field test and repair on any time or event basis, in accordance with one embodiment of the present disclosure.

Referring now to FIG. 8, a block diagram of a distributed background BIST (BBIST) on a multi-banked partition of a memory chip having adjustable parameter settings is shown, according to one or more embodiments. Memory partition M0, is one of multiple partitions in IC 400 of FIG. 4, the number of which depends on the architecture, the overall memory size desired, and the access rate desired. Memory partition M0 includes a plurality of memory banks B0 through BN, as noted in FIG. 4, where N>1, and is N=31 in one embodiment and includes a block of adjustable parameters 840 that is distributed on a partition-by-partition basis, or is centralized for service to the whole IC.

Adjustable parameters block 840 can include one or more of the listed circuits having adjustable (ADJ) or selectable parameters that are related to the operation and access of memory: delay locked loop (DLL) 841, timer 842, bias 843, refresh 844 (REFR), power 845 (PWR), delay 846, etc., as well as sensors, e.g., temperature sensor 847 (TEMP SENS), etc. In one state, circuits in adjustable parameter block 840 satisfy specification requirements for external memory access. In another state, a test state, circuits in adjustable parameter block 840 intentionally do not satisfy specification requirements in order to either quantify the margin for different parameters required to manifest (identify and quantify) weak or failing/failed memory cells and/or to screen out and repair portions of memory at a predetermined threshold value provided by empirical data to ensure memory operation throughout its operational lifespan. That is, circuits in adjustable parameter block 840 have a performance level that has a margin to the specification performance level in order to stress test memory at a harsher condition than specification, whatever that harsher condition may be, e.g., lower driving voltage, longer refresh period, etc. As an example, an operation could seek the shortest refresh period required for the weakest memory cell in a given partition or throughout the entire memory.

Additionally, registers in BBISTM can store and/or communicate statistical information such as variance or standard deviations of distribution of test results.

The BBC 850-0 is one embodiment of a BBIST module, being coupled to: redundant remap registers 806-0 as embodying I/O 350-A; to MAC 804-0, through which the target" memory under test (TMUT) in modules MOD 0 through MOD N including redundant cell module 830-0 is affected, as embodying I/O 350-B; to temporary memory buffer 822-0, as embodying, I/O 350-C; and to adjustable parameters 840 as embodying I/O 350-D. MUX 823-0, 823-N selectively captures the TMUT for their respective bank. BBC 850 has logic that implements the repair operations.

Figure 9A:
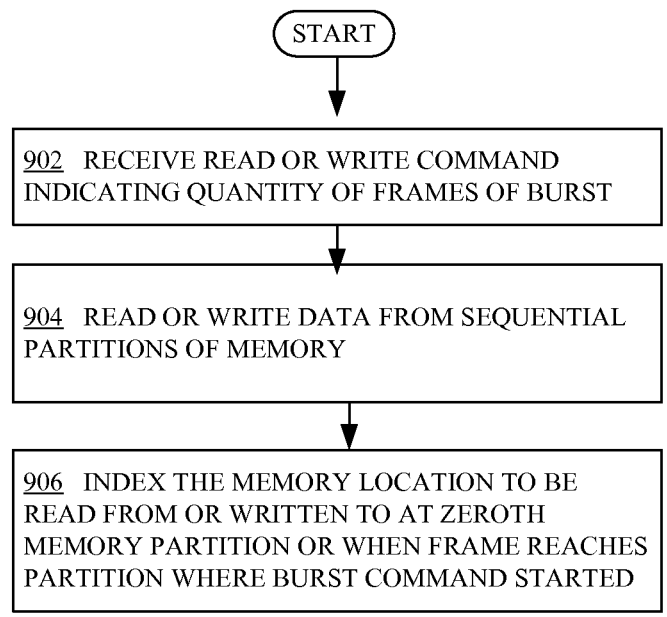
FIG. 9A is a flowchart for performing a burst read or write in memory device in accordance with one embodiment of the present invention.

FIG. 9A is a flowchart 900-A for performing a burst read or write operation in a memory device in accordance with one embodiment of the present invention. In operation 902, memory device 102 receives a read or write command with an op code for burst and an indication of any quantity of supported frames of burst, e.g., 2, 4, 8, etc. In operation 904, data is either read from or written to sequential partitions of memory in a sequential and cyclic overlapping manner. If the burst length is greater than the quantity of memory partitions N in a memory device, e.g., four, then the address is indexed in operation 906 either upon reaching a boundary of the memory device, e.g., the zeroed partition, or upon reaching the partition at which the burst initiated, e.g., partition two. The burst function emulates DRAM burst performance and is especially useful in reducing overhead for related sequential frames of data that otherwise would require a command for every frame of data. Stated differently, a memory transaction can include a memory write burst access via a memory write burst command having a first frame that includes a corresponding opcode positioned in one of a first command slot or a second command slot of a frame and includes a starting address in the memory device, and includes a plurality of subsequent frames for conveying a data payload, wherein the opcode of a given memory write burst command specifies which frames of the plurality of subsequent frames convey the associated data payload and a condition for incrementing the starting address;

Advantageously, the present disclosure provides for on-the-fly selectability of the length of burst by scheduling in the instruction decode and dispatch block 210 of FIG. 2A. For example, a given command could specify a write burst of two, with the following two frames being data, then followed by a command specifying a write burst of eight, with the following eight frame being data. The frames of data following a write burst command can either be sequential, e.g., consuming both slots of eight frames for a write burst of eight, or interleaved with other commands, e.g., read commands in the left slot and data in the right slot for the next sixteen frames for an eight-word burst. The original write burst command taking only one slot could be supplemented with a read command in the unused slot of the frame. Burst read utilizes the same protocol.

Figure 9B:
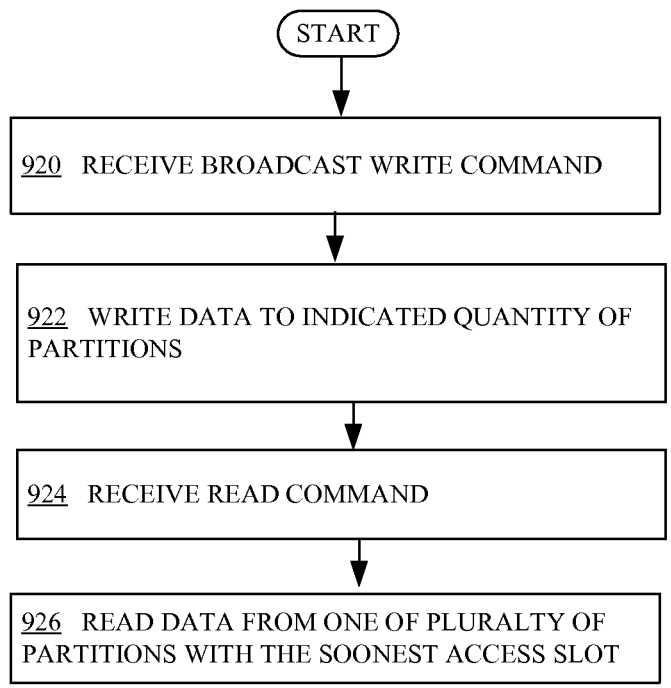
FIG. 9B is a flowchart for performing a broadcast write in memory device in accordance with one embodiment of the present invention.

FIG. 9B is a flowchart 900-B for performing a broadcast write access in memory device in accordance with one embodiment of the present invention. First, in operation 920, a broadcast write command is received at memory device 102. The command can specify the quantity of partitions to which the data is to be written, e.g., all or N/2 of N partitions. In operation 922, the write data is then written to the indicated quantity of partitions. If a subsequent read command with a command for the given bank and index is received in operation 924, the partition portion of the address is disregarded, and the data can be provided from any of the multiple partitions, and preferably from the partition with the next available access slot. Alternatively, the host sending the access command will simply indicate whichever partition the memory device 102 will be at for the time the host desires the access, without any scheduling synchronizing concerns between the host and the memory device, since the host knows the data will be available in a plurality of memory partitions in one embodiment, and in all memory partitions in another embodiment, Each of the memory partitions is independently accessible in the present embodiment. Thus, in a best case scenario, the broadcast function potentially save N−1 access cycles, e.g., three access cycles for an N=3 system having four partitions, by retrieving data from next available partition M2, rather than waiting three cycles to move from partition M3, M4, and finally M1, if the data were only stored in partition M1. Frequently accessed data is one of the many candidates for a broadcast operation. More detail on burst read/write and broadcast write is presented in previously incorporated U.S. patent application Ser. No. 13/077,261.

Functions and configurations of memory device 102 described herein can be combined in any combination in one embodiment, including homogenous or heterogeneous functions. Streamlined combinations for given applications are provided in the following table.

TABLE 1

| | Functional Combinations for Memory Device | | | | |
|---|---|---|---|---|---|
| Configuration | Metering/Stats | RMW | Burst | Broadcast Write | BCR |
| Legacy | — | X | — | — | — |
| Metering/Stats | X | X | — | — | — |
| Burst | — | — | X | X | — |
| Access | — | — | — | — | X |

The legacy configuration provides a device compatible with a prior generation memory device, thus including only a read/modify/write (RMW) function, for performing atomic, in-die, operations. The metering stats configuration is slated for providing only metering and statistics function along with the RMW function which allows on-chip computation and updates to metering and statistics with only the single command from the access device, thereby saving an extra round-trip from the memory device to the access device for computing and then back to the memory device for storing, as shown in FIG. 7. An example scenario for statistics calculation by memory device is also described in FIG. 6. The burst configuration provides burst function for both read and write operations along with the broadcast function. Due to the high data throughput for burst, BCR function is not utilized in a preferred embodiment for reduced complexity and die size. The access configuration of the memory device, not to be confused with the access device, provides only the BCR function. The BCR function provides true RAM emulation such that the partitioned memory appears as a flat memory, with an unrestricted read and writes capability. A combination of these differently configured devices for a given line card application provides a hierarchy of combinatorial functions that substantially improve bandwidth and reduce latency in customized solutions. The memory configuration M0-M3 is the same in one embodiment for all the different functional configurations listed herein. The exemplary configurations and combinations of functions shown in Table 1 result from marketing and engineering tradeoffs and efficient design considerations e.g. die size, power consumption, etc. The present descriptions are well suited to any combinations of functions described herein, should an application arise to utilize them.

Referring now to FIGS. 10A, 10B, 10C, 10D, and 10E, block diagram of a either a planar or a stacked multi-chip modules (MCMs), known also as multi-chip-packages (MCPs), is shown including a combination of differently configured memory devices in accordance with one embodiment of the present invention. In particular, multi-chip module 1001-A of FIG. 10A packages multiple heterogeneously configured versions of memory device 102 in a cascaded manner on a single plane, as a preferred layout for ball grid array (BGA) interface. In the present embodiment, one device is configured as an access configuration chip 1004 and another device is configured as a metering/statistics chip 1006. One port of each memory device can be configured to communicate bidirectionally between the memory devices themselves and with the access device, as shown in MCM 1001-A.

Alternatively, in FIG. 10B, transmitters of both ports can be grouped together to communicate unidirectionally with one device, e.g., from device 1004 to 1006, as shown in MCM 1001-B. Receivers can likewise be coupled in this manner. A chip identifier bit in the command code can be used to identify each chip uniquely to an access device, such as a packet processor, and to each other. In this manner, the density and/or the functionality of the memory devices can be compounded, e.g., by having different functional versions of memory devices, while maintaining a fixed quantity of ports, e.g., two, at the cost of latency from communications on the module between the two chips. In yet another embodiment not shown, memory devices can be independently packaged in a module, with each memory device coupled to only one bidirectional port accessible to an external device, with no communication between devices, in which case the external ports out of the module would scale. In this case, the depth of the memory device would appear to double to the external device.

Referring now to FIG. 10C, two devices 1004, and 1006 are disposed in the same MCM 1001-C, but both devices 1004 and 1006 have all ports, Port A and Port B, accessible for access external to the MCM 1001-C. In this manner, each device 1004 and 1006 are conveniently packaged as a single unit for ease of installation, while retaining the ability to operate independently from each other, with no direct communication between them.

In FIG. 10D, MCM 1001-D shows a stacked die configuration with Access chip 1004 stacked above Meter/Stats chip 1006, e.g., using a through-silicon via. These MCMs provide expanded function performance in a single module with reduced cost compared to a single die having all available combinations of functions. In the present embodiment, each memory device 1004 and 1006 is individually slaved to a single port, e.g., Port A to memory 1004 and Port B to memory 1006, with neither memory device 1004 or 1006 talking directly to each other inside the MCM, though another embodiment provides this intra-module communication. Alternatively, multiple memory devices can be disposed on a silicon interposer. Because memory device 1004 and 1006 utilize segregated Tx and Rx terminals on opposite edges of the package, they can be either aligned with each other or orthogonally disposed with respect to each other.

In contrast, MCM 1001-E FIG. 10E is the same configuration as FIG. 10D, with the addition of through-silicon via (TSV), shown as arrows between linking devices 1004 and 1006 at their interface. Port B of device 1006 could communicate to port A of device 1004, using GCI or some other protocol. The through silicon vias allow the benefits of reducing external wiring and connections, using instead bumps on the die and balls on the PCB to communicate signals and power/ground more directly.

In another embodiment, memory device 1004 uses one port to double the density of the memory and compound the functionality of the module by having two different versions or configurations of memory device, using one of their ports to communicate there between, cascaded format More detail on instruction set architecture is presented in commonly owned U.S. patent application Ser. No. 12/887,298 to Mark Baumann and Michael Miller, entitled "VLSI PACKAGE FOR HIGH PERFORMANCE INTEGRATED CIRCUIT" which is hereby incorporated by reference in its entirety.

Figure 11:
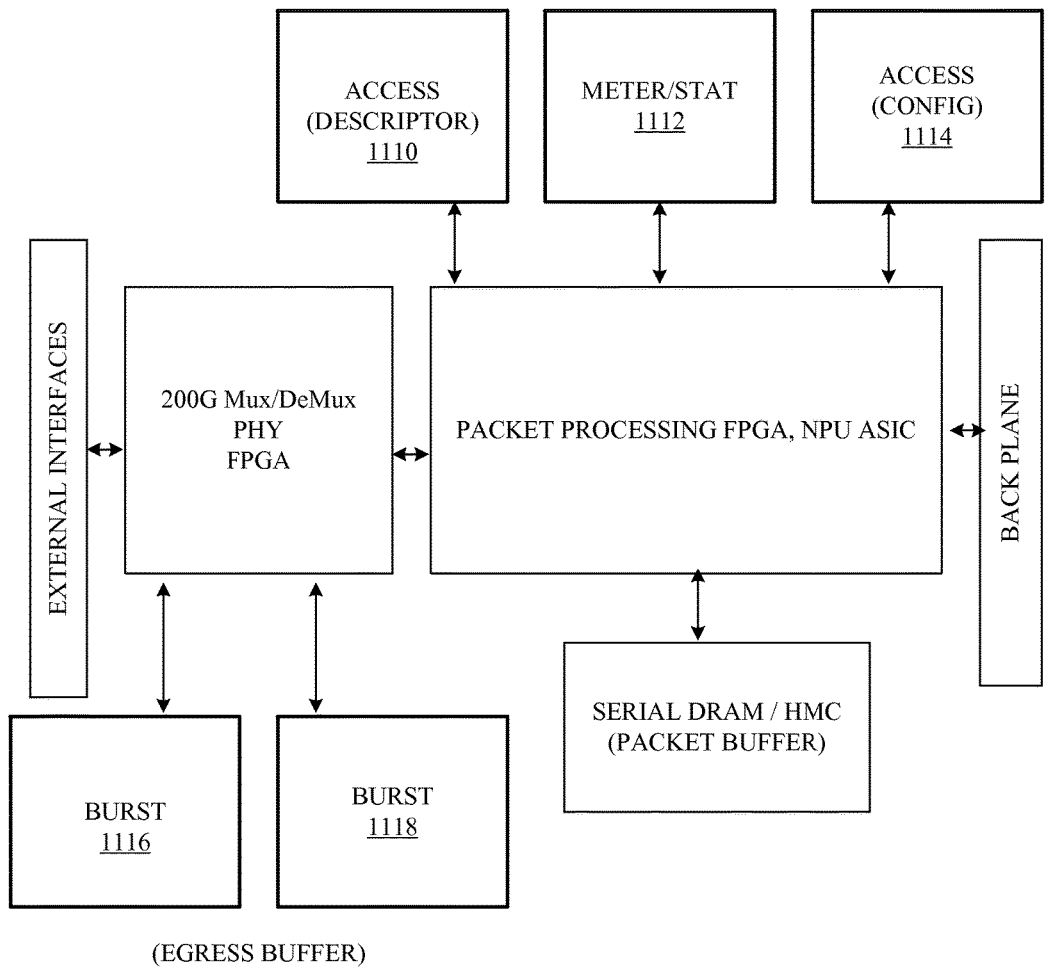
FIG. 11 is a block diagram of a network solution applying a combination of differently configured memory devices to support the packet processor and mux/demux functions of a line interface card in accordance with one embodiment of the present invention.

FIG. 11 is a block diagram of a network solution applying a combination of differently configured memory devices to support the packet processor and mux/demux functions of a line interface card in accordance with one embodiment of the present invention. As an example of the multiple and exponential productivity increases that arise from tailoring multiple differently-configured memory devices parallelly coupled to a network processing application, system 1100 implements three differently configured memory devices coupled thereto for providing four different applications to the line card. Specifically, high access memory device 1114 is used as in a 'configuration' application to support read-intensive operations from infrequently modified packet processor tables to identify packet or user configurations. Conversely, high access memory device 1110 is used in a 'descriptor' application for frequent random access to update and read from tables to inform packet processor how a given packet should be routed or what operations should be performed. Metering and statistics device 1112, used for policing traffic and bandwidth usage, offloads the counting and updating operations from the packet processor via one-way commands to device 1112. This read-modify-write capable device alleviates the one or more bidirectional communications otherwise required for commodity memory used in the same capacity. The highly efficient command scheduling provided by the differently-configured memory devices herein can be supplemented with industry standard DRAM generic memory, e.g., serial DRAM, for basic packet buffering, The 200 G Mux/Demux utilizes two burst-configured memory devices 1116, 1118 to provide an egress buffer function for different data rate lines, e.g., a 200 Gb input and 20×10 Gb output lanes. This application provides efficient buffering for micro bursting and oversubscription of balanced read and write traffic. Overall, the differently configured as memory devices 1110-1118 with serial interface, high access rate, high density, low pin count, and low power consumption provide a substantial improvement in throughput of line card.

Figure 12A:
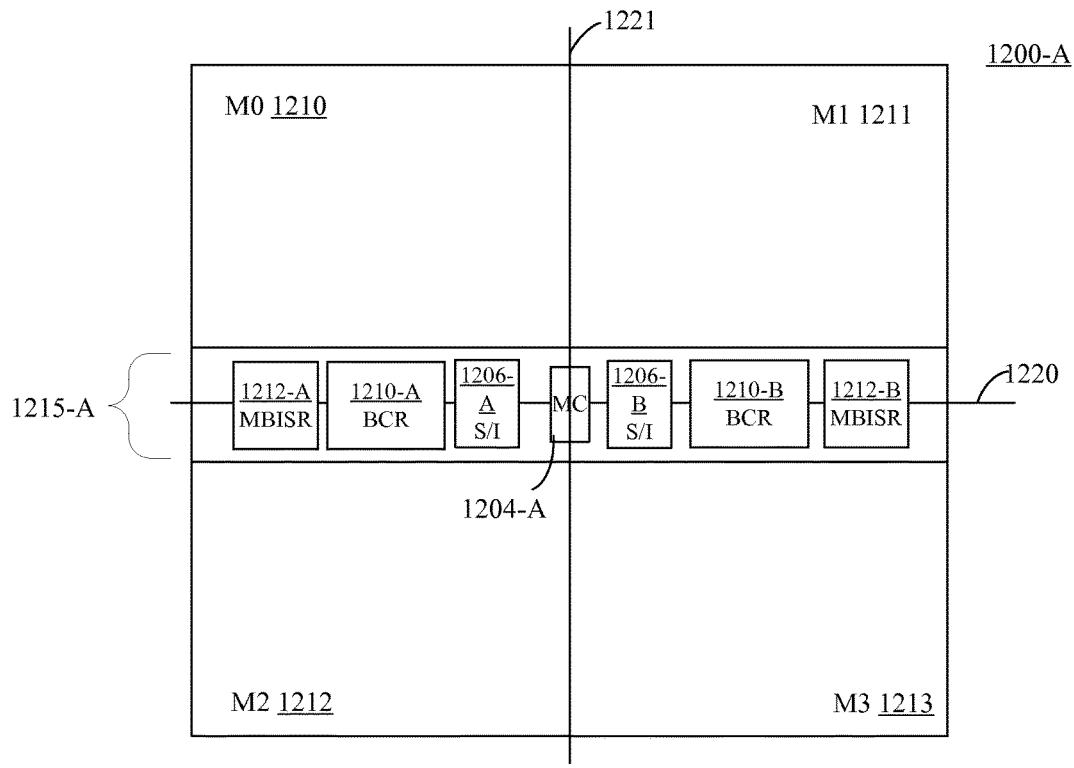
FIGS. 12A and 12B are die layouts of the memory device in accordance with one embodiment of the present invention.
Figure 12B:
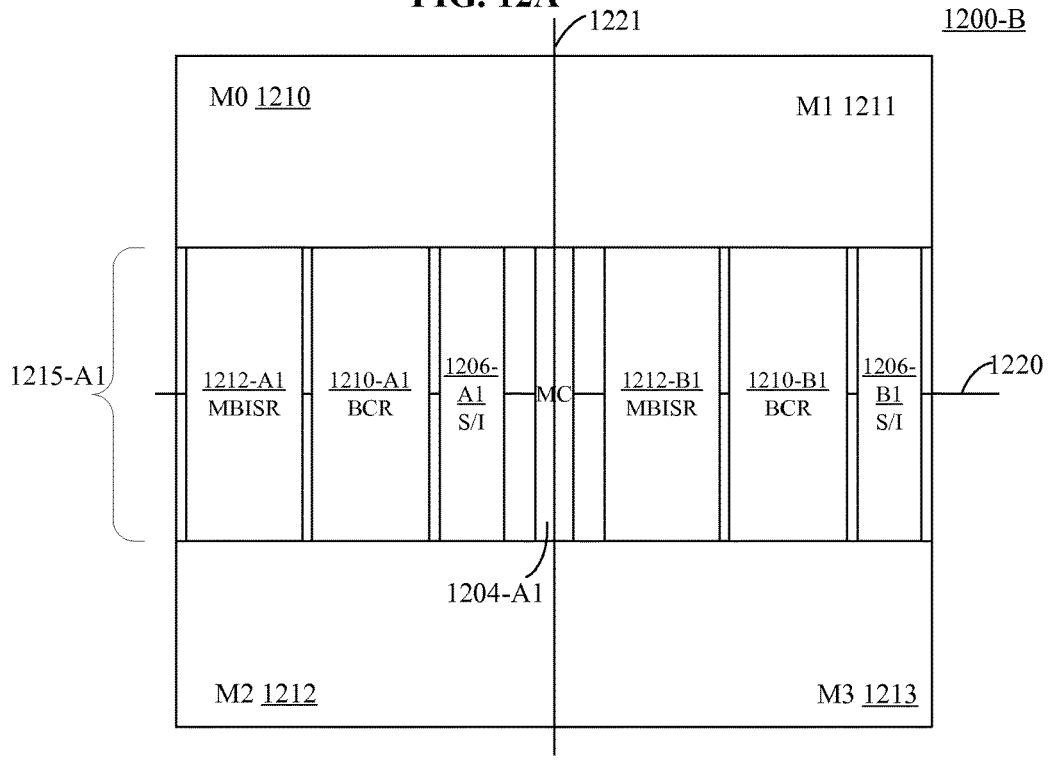

FIGS. 12A and 12B are die layouts of the memory device in accordance with one embodiment of the present invention. Memory blocks M0 1210 and M1 1211 form a first memory while memory blocks M2 1212 and M3 1213 from a second memory macro, each of which are disposed on one side of a corridor 1215-A extending across a center portion of die 1200-A. Corridor 1215-A is centered on axis 1220 at an approximate midline of the die in one direction, with functional blocks located therein, that are symmetrically disposed with respect to midline 1221, which is orthogonal to midline 1220. While the present disclosure is well suited to a reasonable amount of asymmetry, the benefit of symmetrical disposition of memory and functional blocks are balanced signal delay, or trace lengths, across a deterministic synchronized circuit. Thus, memory core logic block 1204 is disposed centrally in the die 1200, located approximately at the intersection point of midlines 1220, 1221 as the primary point of communications to memory blocks M0-M3. Serial interface 1206-A, -B MC block 1204 are disposed symmetrically about MC 1204 with respect to both midline 1220 and 1221, because received at and transmitted signal traffic from die 1200 are communicated primarily between MC 1204 and serial interface 1206-A, -B. Disposed symmetrically outboard of serial interface 1206-A, -B with respect to midline 1221 are the bank conflict resolution blocks 1210-A, -B. Disposed symmetrically outboard of BCR 1210-A, -B, with respect to midline 1221, are memory BISR blocks 1212-A, -B. MBISR blocks 1212-A, -B are disposed the furthest from MC 1204 because of their infrequent use, and thus, lowest overall contribution to latency. Corridor 1215-A can be located anywhere about the approximate center 10-30% of the area of die 1200, spanning from one edge of the die to the opposite edge of the die, with functional components disposed in a wide variety of layouts therein, depending upon the application.

The benefits of signal balance and reduced latency can still be maintained if the memory blocks M0-M3 and corridor 1215-A are asymmetric with respect to the edges of the die, e.g., offset from one or more sides of the die, so long as the relationship between M0-M3 and corridor 1215-A itself is maintained. Thus, if the memory system herein were integrated on a die having a central processing unit (CPU) or other large functional blocks consuming a large portion of the die, e.g., located in a center of the die, or consuming more than 25-35% of the die for example, then memory system can still maintain the performance advantage from the present layout if the relationship and symmetry of the memory and the corridor and/or the relationship and symmetry of the functional blocks with respect to themselves within corridor 1215-A are maintained. In comparison, FIG. 12B illustrates a die 1200-B with a different embodiment of the height of functional blocks in central corridor 1215-A1 and a different embodiment having an asymmetric arrangement of the functional blocks with respect to midline 1221. Specifically, a sequence of functional blocks moving outward left from memory controller MC 1204A include 1206-A1 S/I, 1210-A1 BCR, and 1212-A1 MBISR, thus matching the sequence of left side of die 1200-A. In contrast, functional blocks on the right side of die 1200-B do not match the sequence of blocks on the right side of die 1200-A, instead having a sequence of 1212-B1 MBISR, 1210-B1 BCR, and 1206-B1 S/I when moving from MC 1204A outward right.

Figure 12C:
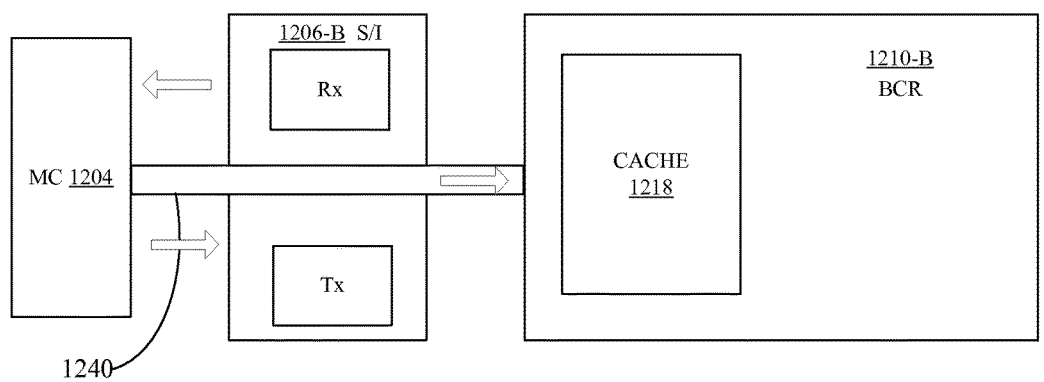
FIG. 12C is a layout for tunneling through the serial interface for links between the core logic and bank conflict resolution blocks in accordance with one embodiment of the present invention.

FIG. 12C is a layout illustrating tunneling through the serial interface of data links between the core logic and the bank conflict resolution block in accordance with one embodiment of the present invention. It is beneficial to dispose the serial interface 1026-B to the MC block 1204 because of the high rate of traffic between these two function blocks. Similarly, the pair of function blocks with the next highest traffic is the MC block 1204 to cache 1218 in BCR block 1210-B. To avoid routing of data lines around serial interface block 1206-B and incur latency, data lines 1240 are disposed between SerDes blocks in serial interface 1206-B. Specifically, Rx and Tx blocks are symmetrically disposed on either side of the lanes coupling MC 1204 and MBISR 1210-B such that data lines between MC 1204 and BCR 1210-B are nested within, or bounded by, and approximately parallel to, data lines routed between MC 1204 and serial interface 1206-B, thought they may be routed via different metal layers to reduce any interference or coupling effect.

The foregoing descriptions of specific embodiments of the present disclosure have been presented for purposes of illustration and description. They are not intended to be exhaustive or to limit the invention to the precise forms disclosed. Many modifications and variations are possible in light of the above teaching without departing from the broader spirit and scope of the various embodiments. The embodiments were chosen and described in order to explain the principles of the invention and its practical application best, and to enable others skilled in the art to best utilize the invention and various embodiments with various modifications as are suited to the particular use contemplated. It is intended that the scope of the invention be defined by the Claims appended hereto and their equivalents.

We claim:

1. An integrated circuit (IC) comprising:
   a memory block having a plurality of banks, wherein each of the banks has a plurality of memory cells, and wherein the memory block has multiple ports;
   an input/output (IO) interface coupled to the memory block;
   a cache coupled to the IO interface and to the plurality of banks, the cache for storing write data designated for a given memory cell location when the given memory cell location is currently being accessed;
   one or more memory access controllers (MACs) coupled to the memory block;
   a plurality of error correcting code (ECC) modules; and
   a plurality of arithmetic logic units (ALUs) wherein:
   at least one of the ALUs performs one or more operations on data
   at least one of the plurality of ALUs is slated individually to at least one of a plurality of partitions;
   at least one of the plurality of ECC modules is slated individually to at least one of a plurality of partitions; and
   each of the plurality of partitions of the memory block comprises two or more of the plurality of memory bank.

2. The IC of claim 1 wherein:
   the one or more operations by at least one of the ALUs will modify or interpret the data in addition to the MACs implementing an access command and in addition the ECC modules implementing an error correction.

3. The IC of claim 1 further comprising:
   a bank-conflict resolution logic; and wherein:
   the cache is configured to manage a plurality of accesses to the plurality of memory cells in the plurality of banks without a conflict such that the memory block appears to be a multi-port random access memory (RAM);
   a read command is able to be performed without latency relative to a write command; and
   the bank-conflict resolution logic is adapted to:
   test validity data of the data stored in the cache; and
   write a data word of the write command to a memory location of a bank in the memory block if the validity data stored in the cache indicates that the data stored in the cache is invalid; and wherein:
   the memory block is a memory partition.

4. The IC of claim 1 wherein the plurality of memory cells have a single-port construction.

5. The IC of claim 1 wherein the memory block is divided into a plurality of independently accessible partitions, with each of the independently accessible partitions comprising a plurality of memory banks, and the independently accessible partitions configured to be accessed in a sequential and cyclic overlapping manner during assigned time slots within a single system clock cycle.

6. The IC of claim 1 wherein:
   at least one of the ALUs is configured to provide a traffic metering for measuring and recording a rate of bytes of traffic for each of a plurality of users based on a bytes input from an external source and based on an elapsed time measured from a (internal) clock signal;
   the metering function receives a quantity of bytes of traffic for each of the plurality of users; and
   the operation of traffic metering is performed wholly within the IC without accessing memory off the IC.

7. The IC of claim 1 wherein at least one of the ALUs is further configured to selectively provide:
a statistics counter function for recording a count of bytes or packets of for each of a plurality of users based on a bytes input from an external source; and wherein
the operations by the at least one of the ALUs on data located in the memory block include increment or decrement statistics operations wholly within the IC without accessing memory off the IC.

8. The IC of claim 1 wherein the IO interface is a serial interface.

9. The IC of claim 5 wherein:
the memory block consumes more than fifty percent of the IC die area;
memory partitions coupled to a serial interface operate at a slower frequency than the serial interface; and
the memory block is a memory other than the cache and other than SRAM.

10. A network system comprising:
at least one packet processor; and
an integrated circuit (IC) comprising:
a memory block having a plurality of banks, wherein each of the banks has a plurality of memory cells, and wherein the memory block has multiple ports;
an input/output (IO) interface coupled to the memory block;
a cache coupled to the IO interface and to the plurality of banks, the cache for storing write data designated for a given memory cell location when the given memory cell location is currently being accessed;
one or more memory access controllers (MACs) coupled to the memory block;
a plurality of error correcting code (ECC) modules; and
a plurality of arithmetic logic units (ALUs); wherein:
at least one of the ALUs performs one or more operations on data
at least one of the plurality of ALUs is slated individually to at least one of a plurality of partitions;
at least one of the plurality of ECC modules is slated individually to at least one of a plurality of partitions; and
each of the plurality of partitions of the memory block comprises two or more of the plurality of memory bank.

11. The network system of claim 10, wherein:
the one or more operations by at least one of the ALUs will modify or interpret the data in addition to the MACs implementing an access command and in addition the ECC modules implementing an error correction.

12. The network system of claim 10, an external access to the memory block is completed with a fixed latency with respect to a system clock.

13. The network system of claim 10, further comprising:
a bank-conflict resolution logic; and wherein:
the cache is configured to manage a plurality of accesses to the plurality of memory cells in the plurality of banks without a conflict such that the memory block appears to be a multi-port random access memory (RAM);
a read command is able to be performed without latency relative to a write command; and
the bank-conflict resolution logic is adapted to:
test validity data of the data stored in the cache; and
write a data word of the write command to a memory location of a bank in the memory block if the validity data stored in the cache indicates that the data stored in the cache is invalid; and wherein:
the memory block is a memory partition.

14. The network system of claim 10, wherein the plurality of memory cells have a single-port construction.

15. The network system of claim 10, wherein the memory block is divided into a plurality of independently accessible partitions, with each of the independently accessible partitions comprising a plurality of memory banks, and the independently accessible partitions configured to be accessed in a sequential and cyclic overlapping manner during assigned time slots within a single system clock cycle.

16. The network system of claim 10, wherein:
at least one of the plurality of ALUs is configured to provide a traffic metering for measuring and recording a rate of bytes of traffic for each of a plurality of users based on a bytes input from an external source and based on an elapsed time measured from a (internal) clock signal;
the metering function receives a quantity of bytes of traffic for each of the plurality of users; and
the operation of traffic metering is performed wholly within the IC without accessing memory off the IC.

17. The network system of claim 10, wherein the ALU is further configured to selectively provide:
a statistics counter function for recording a count of bytes or packets of for each of a plurality of users based on a bytes input from an external source; and wherein
the operations by the ALU on data located in the memory block include increment or decrement statistics operations wholly within the IC without accessing memory off the IC.

18. The network system of claim 10, wherein the IO interface is a serial interface.

19. The network system of claim 15, wherein:
the memory block consumes more than fifty percent of the IC die area;
memory partitions coupled to a serial interface operate at a slower frequency than the serial interface; and
the memory block is a memory other than the cache and other than SRAM.

20. The IC of claim 1 wherein:
the ALU can access, modify and retire a networking operation wholly within the IC, without accessing memory off the IC.

21. The IC of claim 1 wherein:
at least one of the plurality of ALUs is a shared resource to one or more of the plurality of partitions.

22. The IC of claim 1 wherein:
at least one, but less than all, of the plurality of ALUs is slated individually to at least one of a plurality of partitions; and
at least one, but less than all, of the plurality of ALUs is a shared resource to one or more of the plurality of partitions.

23. The IC of claim 1 wherein:
a plurality of the ECC modules is slated to each of the plurality of partitions.

24. The IC of claim 1 wherein:
a plurality of the partitions is written to in a broadcast function of a given data;
at least one of the plurality of partitions written to can be accessed for a read of the given data, in order to decrease latency for a read operation.

25. The IC of claim 1 wherein:
the IC performs a read/modify/write (RMW) function, as an atomic, in-die, operation.

\* \* \* \* \*